US012217659B2

(12) United States Patent
Lai et al.

(10) Patent No.: US 12,217,659 B2
(45) **Date of Patent: *Feb. 4, 2025**

(54) DISPLAY PANEL, DRIVING METHOD THEREOF AND DISPLAY DEVICE

(71) Applicant: Xiamen Tianma Micro-Electronics Co., Ltd., Xiamen (CN)

(72) Inventors: Qingjun Lai, Xiamen (CN); Yihua Zhu, Xiamen (CN); Ping An, Xiamen (CN)

(73) Assignee: Xiamen Tianma Micro-Electronics Co., Ltd., Xiamen (CN)

( * ) Notice: Subject to any disclaimer, the term of this patent is extended or adjusted under 35 U.S.C. 154(b) by 44 days.

This patent is subject to a terminal disclaimer.

(21) Appl. No.: 18/108,284

(22) Filed: Feb. 10, 2023

(65) Prior Publication Data

US 2023/0186842 A1 Jun. 15, 2023

Related U.S. Application Data

(63) Continuation of application No. 17/467,933, filed on Sep. 7, 2021, now Pat. No. 11,600,219.

(30) Foreign Application Priority Data

Oct. 15, 2020 (CN) ............................ 202011105592

(51) Int. Cl.
*G09G 3/32* (2016.01)

(52) U.S. Cl.
CPC ......... *G09G 3/32* (2013.01); *G09G 2300/043* (2013.01); *G09G 2300/0819* (2013.01); *G09G 2320/0233* (2013.01); *G09G 2320/045* (2013.01)

(58) Field of Classification Search
CPC ............... G09G 3/32; G09G 2300/043; G09G 2300/0819; G09G 2320/0233; G09G 2320/045; G09G 3/3233; G09G 2300/0842; G09G 2300/0861; G09G 2310/0262; G09G 2310/08; G09G 3/30; G09G 3/3225
See application file for complete search history.

(56) References Cited

U.S. PATENT DOCUMENTS

2020/0273411 A1* 8/2020 Gao ..................... G09G 3/3291
2022/0059030 A1* 2/2022 Sang .................... G09G 3/3233

FOREIGN PATENT DOCUMENTS

CN 109599062 A 4/2019
CN 110033734 A 7/2019

* cited by examiner

*Primary Examiner* — Amare Mengistu
*Assistant Examiner* — Gloryvid Figueroa-Gibson
(74) *Attorney, Agent, or Firm* — KDW Firm PLLC

(57) ABSTRACT

Provided are a display panel, a driving method thereof and a display device. The display panel includes: a pixel circuit and a light-emitting element, where the pixel circuit includes a light emitting control module, a drive module and a compensation module; the light emitting control module includes a first light emitting control module configured to selectively provide a first power supply signal for the drive module; the drive module is configured to provide a drive current for the light-emitting element and comprises a drive transistor; the compensation module is configured to compensate a threshold voltage of the drive transistor; and a working process of the pixel circuit includes a light emitting stage and a bias stage.

20 Claims, 18 Drawing Sheets

DISPLAY PANEL, DRIVING METHOD THEREOF AND DISPLAY DEVICE

CROSS-REFERENCE TO RELATED APPLICATION

This is a continuation of U.S. patent application Ser. No. 17/467,933, filed Sep. 7, 2021, which claims priority to Chinese Patent Application No. 202011105592.5 filed Oct. 15, 2020, the disclosure of which is incorporated herein by reference in its entirety.

TECHNICAL FIELD

The present disclosure relates to the field of display technologies and, in particular, to a display panel, a driving method thereof and a display device.

BACKGROUND

In a display panel, a pixel circuit provides a drive current required for a light-emitting element of the display panel to perform displaying and controls when the light-emitting element enters a light emitting stage. Thus, a pixel circuit is an indispensable element in most self-luminous display panels.

However, in an existing display panel, the internal characteristics of a drive transistor in a pixel circuit change slowly as the service time increases, causing the threshold voltage of the drive transistor to drift, thereby affecting the overall characteristics of the drive transistor and thus affecting the display uniformity.

SUMMARY

The present disclosure provides a display panel, a driving method thereof and a display device to improve the problem of threshold voltage drift of an existing drive transistor.

The present disclosure provides a display panel which includes a pixel circuit and a light-emitting element. The pixel circuit includes a light emitting control module, a drive module and a compensation module. The light emitting control module includes a first light emitting control module configured to selectively provide a first power supply signal for the drive module. The drive module is configured to provide a drive current for the light-emitting element and includes a drive transistor. The compensation module is configured to compensate a threshold voltage of the drive transistor. A working process of the pixel circuit includes a light emitting stage and a bias stage. In the light emitting stage, the first light emitting control module is on, and conduction is enabled between the drive transistor and the light-emitting element. In the bias stage, the first light emitting control module and the drive module are on, the compensation module is off, the drive transistor is disconnected from the light-emitting element, and the first power supply signal is written into a drain of the drive transistor to adjust a bias state of the drive transistor.

Based on the same concept, the present disclosure further provides a driving method of a display panel. The display panel includes a pixel circuit and a light-emitting element. The pixel circuit includes a light emitting control module, a drive module and a compensation module. The light emitting control module includes a first light emitting control module configured to selectively provide a first power supply signal for the drive module. The drive module is configured to provide a drive current for the light-emitting element and includes a drive transistor. The compensation module is configured to compensate a threshold voltage of the drive transistor. The driving method of at least one frame of the display panel includes: in a light emitting stage, turning on the first light emitting control module, and enabling conduction between the drive transistor and the light-emitting element; and in a bias stage, turning on the first light emitting control module and the drive module, turning off the compensation module, disconnecting the drive transistor from the light-emitting element, and writing the first power supply signal to a drain of the drive transistor so as to adjust a bias state of the drive transistor.

Based on the same inventive concept, the present disclosure further provides a display device. The display device includes the preceding display panel.

BRIEF DESCRIPTION OF DRAWINGS

The drawings used in the description of the embodiments or the existing art will be briefly described below. Apparently, though the drawings described below illustrate some embodiments of the present disclosure, those skilled in the art may obtain other structures and drawings according to the basic concepts of the device structures, the driving method, and the preparing method disclosed by various embodiments of the present disclosure, all of which should fall within the scope of the claims of the present disclosure without any doubt.

DETAILED DESCRIPTION

The solutions of the present disclosure will be described clearly and completely with reference to the accompanying drawings through embodiments from which the objects, solutions, and advantages of the present disclosure will be more apparent. Apparently, the embodiments described herein are part, not all, of the embodiments of the present disclosure. All other embodiments obtained by those skilled in the art based on the basic concepts disclosed by the embodiments of the present disclosure are within the scope of the present disclosure.

Figure 1:
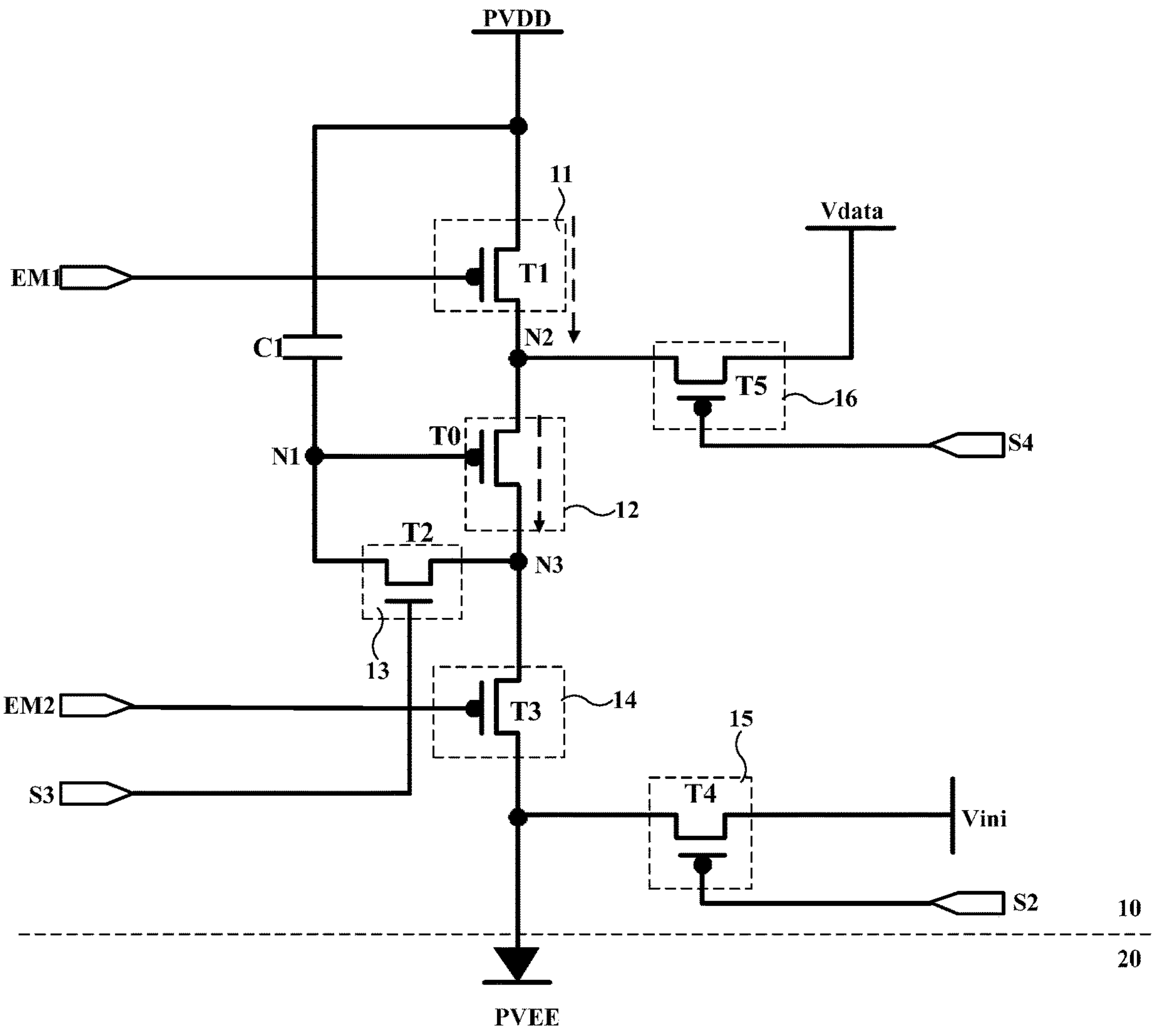
FIG. 1 is a schematic diagram of a pixel circuit of a first display panel provided by an embodiment of the present disclosure.

FIG. 1 is a schematic diagram of a pixel circuit of a first display panel provided by an embodiment of the present disclosure. Referring to FIG. 1, the display panel provided by this embodiment includes a pixel circuit 10 and a light-emitting element 20, where the pixel circuit 10 includes a light emitting control module 11, a drive module 12 and a compensation module 13. The light emitting control module 11 includes a first light emitting control module 11 configured to selectively provide a first power supply signal PVDD for the drive module 12; the drive module 12 is configured to provide a drive current for the light-emitting element 20 and comprises a drive transistor TO; and the compensation module 13 is configured to compensate a threshold voltage of the drive transistor T0. A working process of the pixel circuit 11 comprises a light emitting stage and a bias stage, where in the light emitting stage, the first light emitting control module 11 is on, and conduction is enabled between the drive transistor T0 and the light-emitting element 20; and in the bias stage, the first light emitting control module 11 and the drive module 12 are on, the compensation module 13 is off, the drive transistor T0 is disconnected from the light-emitting element 20, and the first power supply signal PVDD is written into a drain of the drive transistor T0 from a resource of the drive transistor T0 adjust a bias state of the drive transistor T0.

It is to be noted that FIG. 1 just schematically illustrates a key structure in the above embodiment and does not include all of structures in which the circuit operates, and the complete circuit structure will be gradually shown later with the description of this embodiment.

In addition, it is to be noted that the terms such as "the first display panel" and "the first working timing" in the present disclosure are merely intended to distinguish different schematic diagrams and should not be construed as a sequence of the schematic diagrams.

In this embodiment, the pixel circuit 10 includes a first light emitting control module 11, an input terminal of the first light emitting control module 11 receives the first power supply signal PVDD, a control terminal of the first light emitting control module 11 receives a first light emitting control signal EM1, and an output terminal of the first light emitting control module 11 is electrically connected to an input terminal of the drive module 12. The first light emitting control signal EM1 received by the pixel circuit 10 is a pulse signal, and a valid pulse of the first light emitting control signal EM1 controls transmission paths of the input terminal and the output terminal of the first light emitting control module 11 to be turned on to provide the first power supply signal PVDD for the drive module 12; and an invalid pulse of the first light emitting control signal EM1 controls the transmission paths of the input terminal and the output terminal of the first light emitting control module 11 to be turned off. Therefore, under the control of the first light emitting control signal EM1, the first light emitting control module 11 selectively provides the first power supply signal PVDD for the drive module 12.

In this embodiment, the first light emitting control module 11 is connected between a first power supply signal terminal and a source of the drive transistor T0, and the first power supply signal terminal is configured to provide the first power supply signal PVDD; and the compensation module 13 is connected between a gate of the drive transistor T0 and the drain of the drive transistor T0.

The pixel circuit 10 includes the drive module 12, an output terminal of the drive module 12 is electrically connected to the light-emitting element 20, the drive module 12 includes a drive transistor T0, and after the drive transistor T0 is turned on, the drive module 12 provides the drive current to the light-emitting element 20. The source of the drive transistor TO is electrically connected to the input terminal of the drive module 12, and the drain of the drive transistor T0 is electrically connected to the output terminal of the drive module 12. In other embodiments, alternatively, the drain of the drive transistor is electrically connected to the input terminal of the drive module, and the source of the drive transistor is electrically connected to the output terminal of the drive module. It is understandable that the source and the drain of the transistor are not constant but will change as a drive state of the transistor changes.

The pixel circuit 10 includes the compensation module 13 for compensating the threshold voltage of the drive transistor T0. A first pole of the compensation module 13 is electrically connected to the output terminal of the drive module 12, the control terminal of the compensation module 13 receives a scanning signal S3, and a second pole of the compensation module 13 is electrically connected to a control terminal of the drive module 12. The scanning signal S3 received by the pixel circuit 10 is a pulse signal, and a valid pulse of the scanning signal S3 controls transmission paths of the first pole and the second pole of the compensation module 13 to be turned on to adjust a voltage between the control terminal and the output terminal of the drive module 12; and an invalid pulse of the scanning signal S3 controls the transmission paths of the first pole and the second pole of the compensation module 13 to be turned off. Therefore, the scanning signal S3 controls the compensation module 13 to be turned on and may be used for compensating the threshold voltage of the drive transistor T0.

Figure 2:
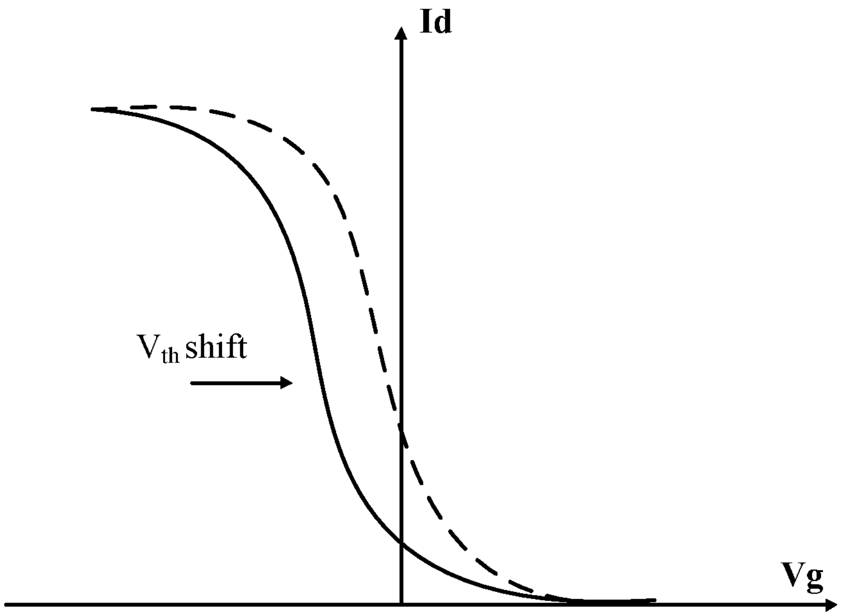
FIG. 2 is a schematic diagram showing a shift of an Id-Vg curve of the drive transistor.

The working process of the pixel circuit 10 includes a light emitting stage. In the light emitting stage, the first light emitting control signal EM1 outputs a valid pulse signal to turn on the first light emitting control module 11, and conduction is enabled between the drive transistor T0 and the light-emitting element 20, so that the drive current flows into the light-emitting element 20 to cause the light-emitting element 20 to emit light. In a non-bias stage, such as a light emitting stage, of the pixel circuit, the gate potential of the drive transistor may be greater than the drain potential of the drive transistor. This setting, if maintained for a long time, may result in the ion polarization inside the drive transistor and the formation of a built-in electric field inside the drive transistor, causing the threshold voltage of the drive transistor to continuously increase. Referring to FIG. 2, FIG. 2 is a schematic diagram showing a shift of the Id-Vg curve of a drive transistor. As shown in FIG. 2, the Id-Vg curve shifts, and the threshold voltage drifts, thereby affecting the stability of the drive transistor and affecting the display uniformity.

Figure 3:
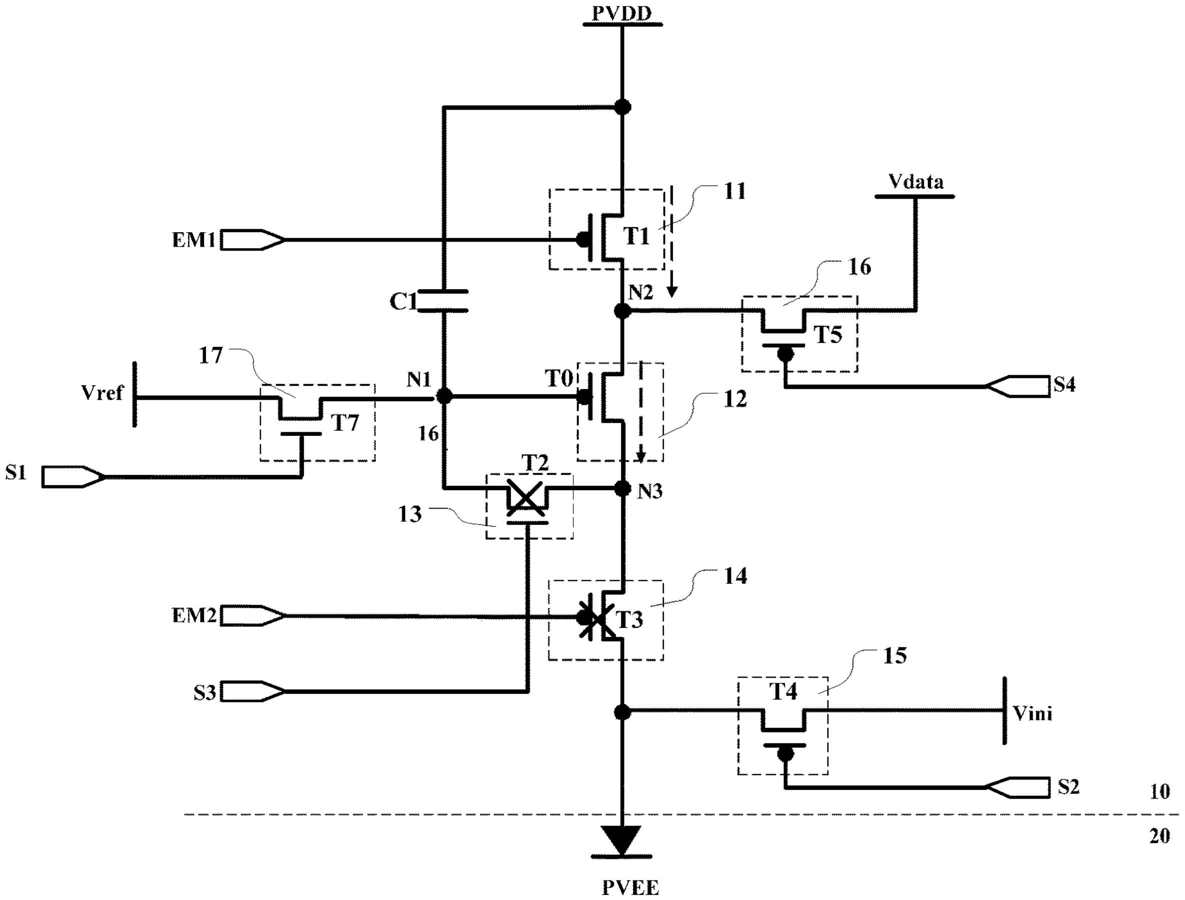
FIG. 3 is a schematic diagram of a pixel circuit of a second display panel provided by an embodiment of the present disclosure.

FIG. 3 is a schematic diagram of a pixel circuit of a second display panel provided by an embodiment of the present disclosure. In this embodiment, a bias stage is added to the working process of the pixel circuit 10. In the bias stage, a first light emitting control module 11 and a drive module 12 are on, and a compensation module 13 is off. Then, a first power supply signal PVDD is written into a drain of a drive transistor T0 via a source of the drive transistor T0 through the first light emitting control module 11 so as to improve a drain potential of the drive transistor T0, adjust a potential difference between a gate potential of the drive transistor T0 and the drain potential of the drive transistor T0, and implement a voltage bias between the gate of the drive transistor T0 and the drain of the drive transistor T0, thereby reducing the degree of ion polarization inside the drive transistor T0, reducing the threshold voltage drift of the drive transistor T0, and improving the display uniformity.

In the embodiment of the present disclosure, the working process of the pixel circuit includes a light emitting stage and the bias stage. As shown in FIG. 3, in the bias stage, the first light emitting control module and the drive module are on, and the compensation module is off so that the drive transistor is disconnected from the light emitting element. Therefore, the first power supply signal is written into the source of the drive transistor through the first light emitting control module which is on, and is then written into a drain of the drive transistor from the source of the drive transistor to adjust a potential of the drain of the drive transistor, thus reducing the threshold voltage of the drive transistor by biasing a gate voltage and a drain voltage of the drive transistor. It is known that in the bias stage, such as the light emitting stage, of the pixel circuit, there may be a case where the gate potential of the drive transistor is greater than the drain potential of the drive transistor, causing the threshold voltage of the drive transistor to drift. Then in the bias stage, the voltage between the gate and drain of the drive transistor is biased so that the threshold voltage drift of the drive transistor in the light emitting stage can be balanced, thereby improving the shift of the Id-Vg curve, and ensuring the display uniformity of the display panel.

Alternatively, the light emitting control module further includes a second light emitting control module 14, and the second light emitting control module 14 is configured to selectively allow a drive current to flow into the light-emitting element 20. In the bias stage, the second light emitting control module 14 is off; and in the light emitting stage, the second light emitting control module 14 is on.

In this embodiment, an input terminal of the second light emitting control module 14 is connected to an output terminal of the drive module 12, an output terminal of the second light emitting control module 14 is connected to the light-emitting element 20, and a control terminal of the second light emitting control module 14 receives a second light emitting control signal EM2. The second light emitting control signal EM2 is a pulse signal. A valid pulse output from the second light emitting control signal EM2 controls transmission paths of the input terminal and the output terminal of the second light emitting control module 14 to be turned on so as to allow the drive current to flow into the light-emitting element 20. An invalid pulse output from the second light emitting control signal EM2 controls the transmission paths of the input terminal and the output terminal of the second light emitting control module 14 to be turned off.

In the bias stage, the first power supply signal PVDD needs to be written into the drain of the drive transistor T0 to bias the gate voltage and the drain voltage of the drive transistor, so that in the bias stage, the second light emitting control module 14 is off to avoid affecting the display effect of the display panel due to that the first power supply signal PVDD drives the light-emitting element 20 through the second light emitting control module 14. In the light emitting stage, when the light-emitting element 20 needs to emit light, the second light emitting control module 14 is turned on to allow the drive current to flow into the light-emitting element 20 and enable the light-emitting element 20 to emit light, thus ensuring the display panel to emit light normally.

Alternatively, the first light emitting control module 11 includes a first transistor T1, a source of the first transistor T1 is configured to receive the first power supply signal PVDD, a drain of the first transistor T1 is connected to the source of the drive transistor TO; the compensation module 13 includes a second transistor T2, a source of the second transistor T2 is connected to the drain of the drive transistor T0, and a drain of the second transistor T2 is connected to the gate of the drive transistor T0. The second light emitting control module 14 includes a third transistor T3, a source of the third transistor T3 is connected to the drain of the drive transistor T0, and a drain of the third transistor T3 is connected to the light-emitting element 20. A gate of the first transistor T1 receives a first light emitting control signal EM1, a gate of the third transistor T3 receives the second light emitting control signal EM2, and a gate of the second transistor T2 receives a scanning signal S3.

Alternatively, a control terminal of the first light emitting control module 11 is connected to a first light emitting control signal line EM1 and is configured to receive the first light emitting control signal EM1. The control terminal of the second light emitting control module 14 is connected to a second light emitting control signal line EM2 and is configured to receive the second light emitting control signal EM2. Here, EM1 represents the first light emitting control signal line and the first light emitting control signal transmitted in the first light emitting control signal line, and EM2 represents the second light emitting control signal line and the second light emitting control signal transmitted in the second light emitting control signal line.

Generally, a width of the first light emitting control signal line EM1 may be equal to a width of the second light emitting control signal line EM2. In some embodiments, alternatively, a width of the first light emitting control signal line EM1 is greater than a width of the second light emitting control signal line EM2. The first light emitting control signal line EM1 outputs a valid pulse in both the bias stage and the light emitting stage, so that the first transistor T1 is turned on. The second light emitting control signal line EM2 outputs a valid pulse in the light emitting stage, and a signal transmission working time of the first light emitting control signal line EM1 is longer than a signal transmission working time of the second light emitting control signal line EM2. Therefore, the width of the first light emitting control signal line may be increased to reduce a transmission impedance of the first light emitting control signal in the first light emitting control signal line, thereby reducing a transmission loss of the first light emitting control signal line EM1 and avoiding that long-term loss accumulation of the first light emitting control signal line affects the bias or the light emission.

Alternatively, in this embodiment, the pixel circuit 10 further includes a reset module 17 which is configured to provide a reset signal Vref for the gate of the drive transistor T0 and perform a reset on the gate of the drive transistor T0. A control terminal of the reset module 17 is configured to receive a first scanning signal S1 which provides the valid pulse for the pixel circuit 10 to turn on the reset module 17.

Alternatively, the reset module 17 includes a seventh transistor T7. A source of the seventh transistor T7 receives the reset signal Vref, a drain of the seventh transistor T7 is electrically connected to the gate or the drain of the drive transistor T0, and a gate of the seventh transistor T7 receives the scanning signal S1.

Alternatively, as shown in FIG. 3, the reset module 17 is connected between a reset signal terminal and the gate of the drive transistor T0, and when the reset module 17 is turned on, the reset signal Vref is applied to the gate of the drive transistor T0 through the reset module 17.

Figure 4:
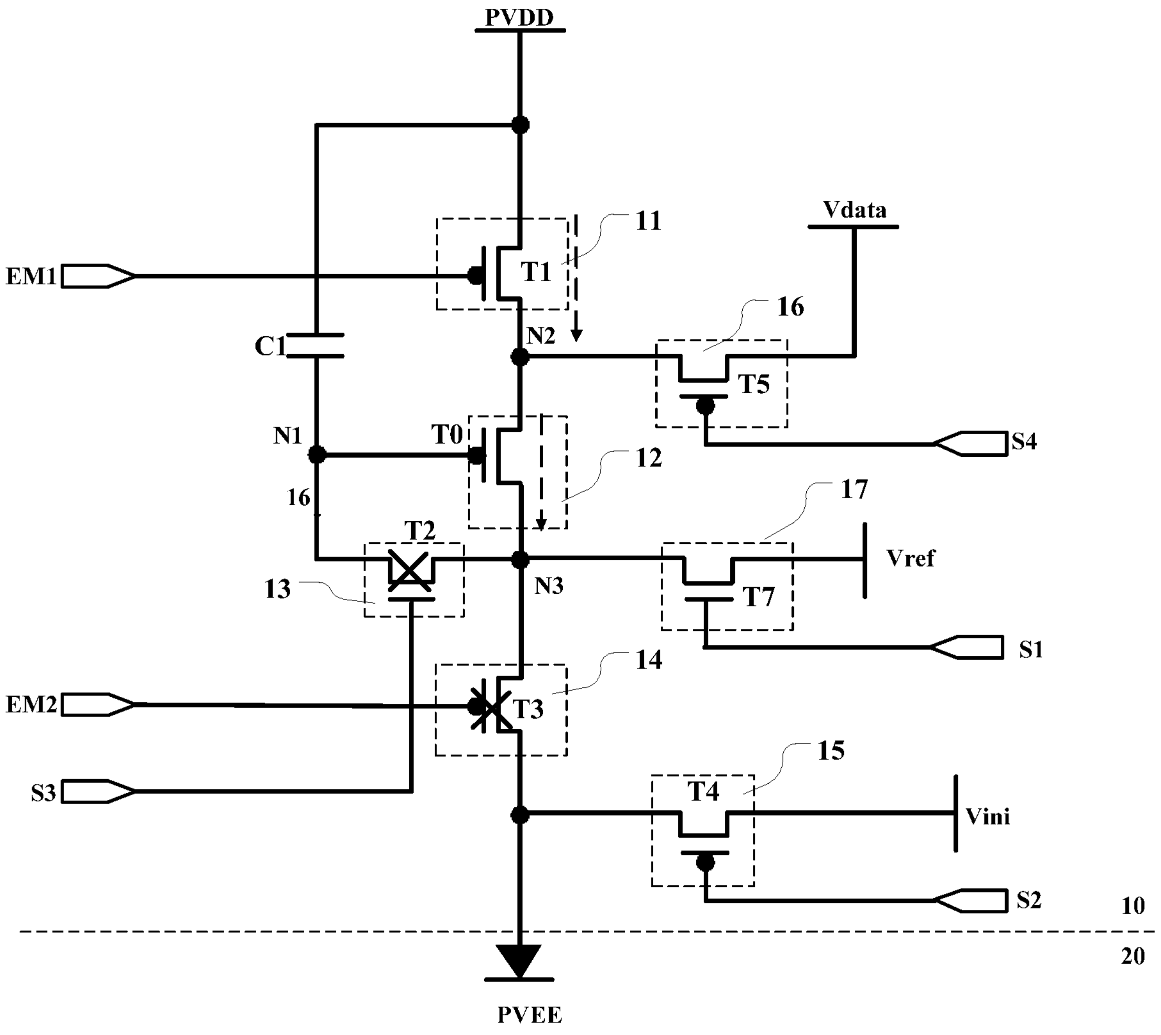
FIG. 4 is a schematic diagram of a pixel circuit of a third display panel provided by an embodiment of the present disclosure.

FIG. 4 is a schematic diagram of a pixel circuit of a third display panel provided by an embodiment of the present disclosure. Referring to FIG. 4, a reset module 17 is connected between a reset signal terminal and a drain of a drive transistor T0, and when the reset module 17 and a compensation module 13 are turned on simultaneously, a reset signal Vref is applied to a gate of the drive transistor T0 through the reset module 17 and the compensation module 13.

Figure 5:
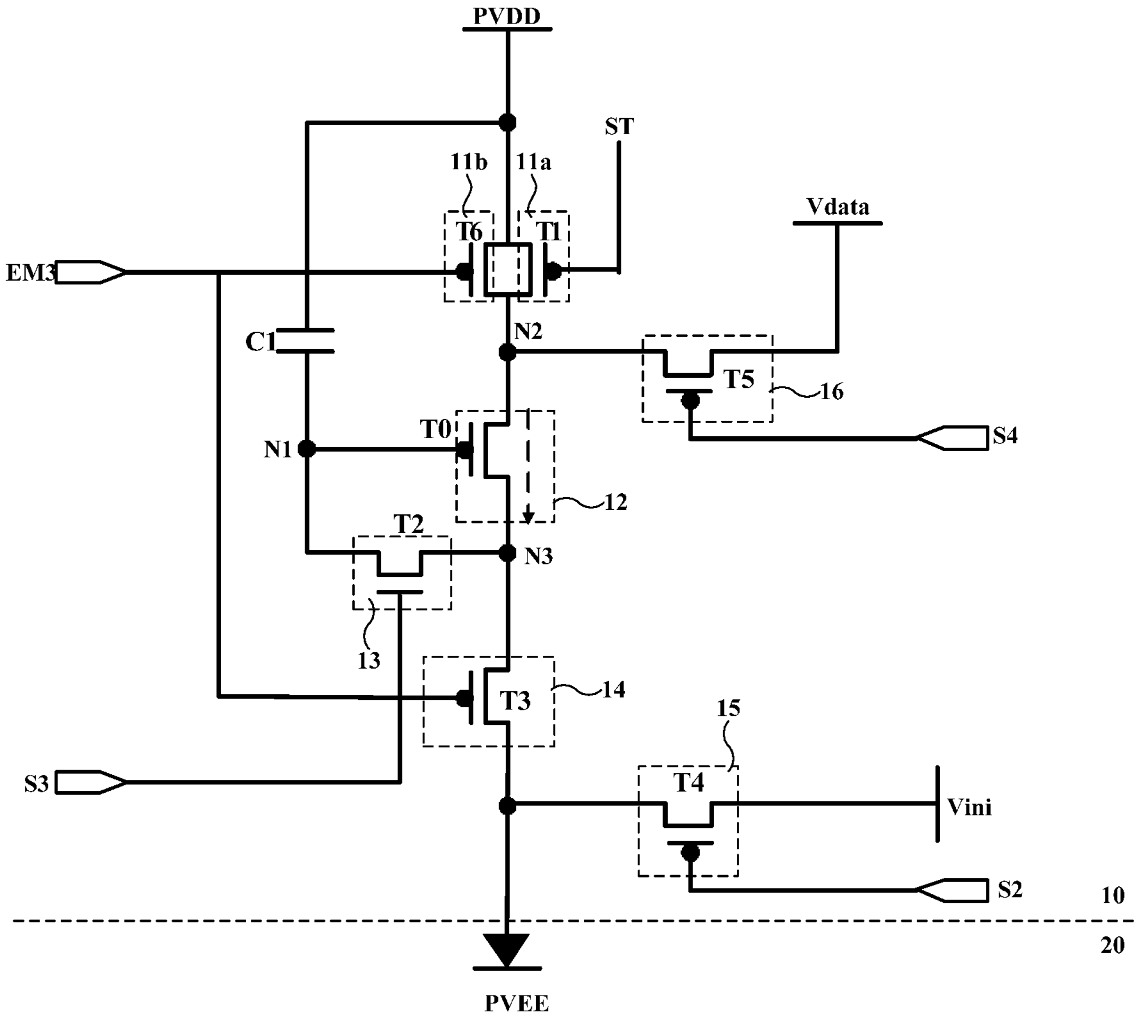
FIG. 5 is a schematic diagram of a pixel circuit of a fourth display panel provided by an embodiment of the present disclosure.

FIG. 5 is a schematic diagram of a pixel circuit of a fourth display panel provided by an embodiment of the present disclosure. Referring to FIG. 5, alternatively, the first light emitting control module 11 includes a first light emitting control sub-module 11*a* and a second light emitting control sub-module 11*b*, where the first light emitting control sub-module 11*a* and the second light emitting control sub-module 11*b* are connected in parallel between a first power supply signal terminal PVDD and the drive module 12. In the bias stage, the second light emitting control sub-module 11*b* is off and the first light emitting control sub-module 11*a* is on. In the bias stage, the first power supply signal PVDD output from the first power supply signal terminal is written into the drain of the drive transistor T0 through the first light emitting control sub-module 11*a* and the drive module 12 which are on, thereby implementing the bias of the drive transistor T0.

Alternatively, a control terminal of the second light emitting control module 14 and a control terminal of the second light emitting control sub-module 11*b* are both connected to a third light emitting control signal line EM3 to receive a third light emitting control signal. In the bias stage, the third light emitting control signal EM3 outputs an invalid pulse signal so that both the second light emitting control signal 14 and the second light emitting control sub-module 11*b* are turned off to prevent the drive current from flowing into the light-emitting element 20, and the first power supply signal PVDD is written into the drain of the drive transistor T0 through the first light emitting control sub-module 11*a* and the drive module 12 which are on. In the light emitting stage, the third light emitting control signal EM3 outputs a valid pulse signal so that both the second light emitting control signal 14 and the second light emitting control sub-module 11*b* are turned on, and then the first power supply signal PVDD sequentially passes through the second light emitting control sub-module 11*b*, the drive module 12 and the second light emitting control signal 14 which are on so that a drive current is generated and flows into the light-emitting element 20.

Alternatively, a control terminal of the first light emitting control sub-module 11*a* is connected to a bias control signal line ST to receive a bias control signal. The bias control signal outputs a valid pulse in the bias stage so that the first light emitting control sub-module 11*a* is turned on, and the first power supply signal PVDD is allowed to be written into the drain of the drive transistor T0.

Figure 6:
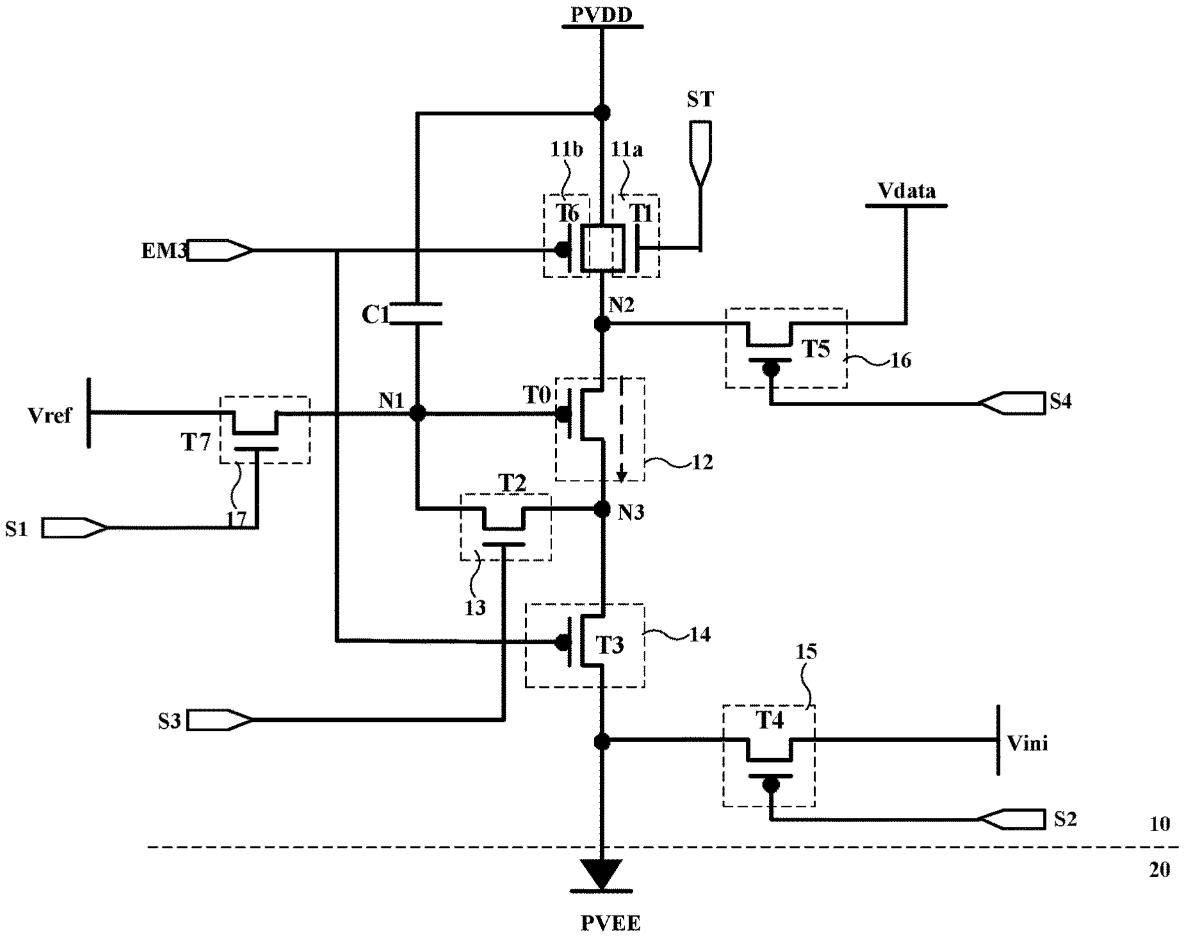
FIG. 6 is a schematic diagram of a pixel circuit of a fifth display panel provided by an embodiment of the present disclosure.
Figure 7:
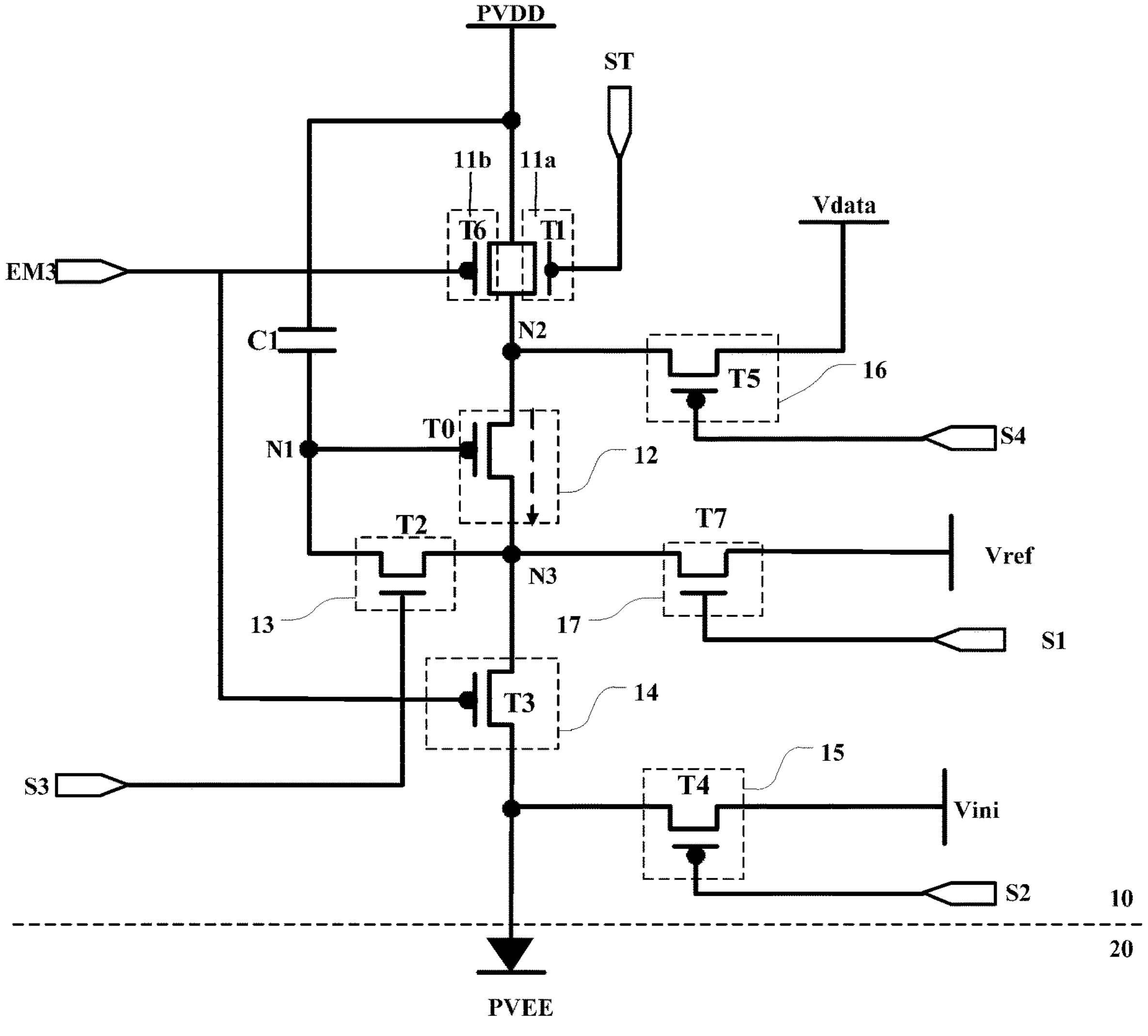
FIG. 7 is a schematic diagram of a pixel circuit of a sixth display panel provided by an embodiment of the present disclosure.

FIG. 6 is a schematic diagram of a pixel circuit of a fifth display panel provided by an embodiment of the present disclosure. FIG. 7 is a schematic diagram of a pixel circuit of a sixth display panel provided by an embodiment of the present disclosure. Referring to FIGS. 6 and 7, alternatively, a display panel also includes a reset module 17 to selectively provide a reset signal for a gate of a drive transistor T0. A control terminal of the reset module 17 is connected to a first scanning signal line S1 to receive the first scanning signal S1. In some optional embodiments, as shown in FIG. 6, a bias control signal ST is a same signal as the first scanning signal S1.

As shown in FIGS. 6 and 7, an input terminal of the reset module 17 receives a reset signal Vref, a control terminal of the reset module 17 receives a first scanning signal S1, and an output terminal of the reset module 17 is electrically connected to a gate or a drain of the drive transistor T0. The first scanning signal S1 provides a valid pulse to a pixel circuit 10 so that the reset module 17 is turned on, and as shown in FIG. 6, the reset signal Vref is directly written into the gate of the drive transistor T0 and a reset is performed. Alternatively, the first scanning signal S1 provides a valid pulse to the pixel circuit 10 and a scanning signal S3 provides the valid pulse to the compensation module 13 so that the reset module 17 and the compensation module 13 are turned on, and as shown in FIG. 7, the reset signal Vref is written into the gate of the drive transistor T0 through the compensation module 13 and the reset is performed. The reset signal Vref is usually a negative voltage signal, such as −7V, so that the gate of the drive transistor T0 is at a negative voltage in the reset stage, which facilitates the subsequent bias adjustment and data writing.

Alternatively, the pixel circuit 10 further includes an initialization module 15 to selectively provide an initialization signal Vini to the light-emitting element 20, where the initialization module 15 is on in at least part of a time period of the bias stage. A control terminal of the initialization module 15 is connected to a second scanning signal line S2 to receive a second scanning signal. As shown in FIG. 7, the bias control signal ST and the second scanning signal S2 may be a same signal. An input terminal of the initialization module 15 receives the initialization signal Vini, an output terminal of the initialization module 15 is electrically connected to the light-emitting element 20, and a control terminal of the initialization module 15 receives the scanning signal S2. In the initialization stage, the scanning signal S2 provides the valid pulse for the pixel circuit 10 to turn on the initialization module 15, and the initialization signal Vini is written into the light-emitting element 20 of the pixel circuit 10 for initialization. The initialization signal Vini is usually a negative voltage signal, so that an anode of the light-emitting element 20 is at a negative initial voltage in the initialization stage.

Alternatively, the pixel circuit 10 further includes a data writing module 16 to write a data signal Vdata to the gate of the drive transistor T0. An input terminal of the data writing module 16 receives the data signal Vdata, an output terminal of the data writing module 16 is connected to an input terminal of the drive module 12, and the control terminal of the data writing module 16 receives a scanning signal S4. The scanning signal S4 outputs a valid pulse signal in the data writing stage, and the scanning signal S3 provides the valid pulse to the compensation module 13, so that the data signal is written into the gate of the drive transistor TO through the data writing module 16 and the compensation module 13 which are on.

Alternatively, the initialization module 15 includes a fourth transistor T4. A source of the fourth transistor T4 is configured to receive the initialization signal Vini, a drain of the fourth transistor T4 is connected to the anode of the light-emitting element 20, and a gate of the fourth transistor T4 is configured to receive the scanning signal S2.

Alternatively, the data writing module 16 includes a fifth transistor T5. A source of the fifth transistor T5 receives the data signal, a drain of the fifth transistor T5 is connected to a source of the drive transistor T0, and a gate of the fifth transistor T5 is configured to receive the scanning signal S4.

Alternatively, a second light emitting control sub-module 11*b* includes a sixth transistor T6. A source of the sixth transistor T6 receives a first power supply signal PVDD, a drain of the sixth transistor T6 is connected to the source of the drive transistor T0, and a gate of the sixth transistor T6 is configured to receive a third light emitting control signal EM3.

Alternatively, the reset module 17 includes a seventh transistor T7. A source of the seventh transistor T7 receives the reset signal Vref, a drain of the seventh transistor T7 is electrically connected to the gate or the drain of the drive transistor T0, and a gate of the seventh transistor T7 receives the scanning signal S1.

Alternatively, the pixel circuit 10 further includes a storage capacitor C1. A first electrode plate of the storage capacitor C1 is connected to a first power supply signal terminal, and a second electrode plate of the storage capacitor C1 is connected to the gate of the drive transistor T0.

In the bias stage, the first transistor T1 and the drive transistor T0 are on, a second transistor T2 is off, and the first power supply signal PVDD is written into the drain of the drive transistor T0 to bias a drain voltage and a gate voltage of the drive transistor T0.

Alternatively, T0, T1, T3, T4, T5 and T6 are each a PMOS using polysilicon as an active layer, and T2 and T7 are each an NMOS using indium gallium zinc oxide as an active layer. It is understandable that the valid pulse of the scanning signal of the NMOS transistor is a high-level signal, and the valid pulse of the scanning signal of the PMOS transistor is a low-level signal. It is to be noted that the pixel circuits shown in FIGS. 1 to 7 are merely examples, and the structures of the pixel circuits in the embodiments of the present disclosure are not limited to these examples. For example, in other embodiments, alternatively, the pixel circuit may be in a 6T1C structure, and not include the initialization module. It is understandable that the structure of the pixel circuit is changed, and the driving timing varies with the structure of the pixel circuit in the case where the driving principle is unchanged.

In this embodiment, alternatively, a width-to-length ratio of a channel region of the NMOS transistor is greater than a width-to-length ratio of a channel region of the PMOS transistor. In the present disclosure, the NMOS transistor mainly functions as a switching transistor and requires a rapid response capability. A transistor having a larger width-to-length ratio has a channel region of a shorter length and thus has a better response capability.

In addition, in the present disclosure, four scanning signals, S1, S2, S3, and S4, may be different. In some particular cases, for example, in a case where the timing meets a certain condition, at least two of the four signals, S1, S2, S3, and S4, may be the same signal. For example, in a case where T4 and T7 are the same type of transistors such as PMOS transistors or NMOS transistors, S1 and S2 may be the same signal. The particular situation depends on the specific circuit structure and timing and is not limited in this embodiment.

Alternatively, in this embodiment, the first power supply signal received by the first light emitting control module in the light emitting stage and the first power supply signal received by the first light emitting control module in the bias stage may be the same or different. In a case where the first power supply signal received by the first light emitting control module in the light emitting stage and the first power supply signal received by the first light emitting control module in the bias stage are the same, only one first power supply signal is needed to meet requirements in the light emission stage and the bias stage, thus fully simplifying the working procedure of the panel. In some embodiments, a value of the first power supply signal received by the first light emitting control module in the light emitting stage is not equal to a value of the first power supply signal received by the first light emitting control module in the bias stage. For example, the first power supply signal in the light emitting stage is PVDD1, the first power supply signal in the bias stage is PVDD2, and PVDD1 may be equal to or not equal to PVDD2. In some embodiments, PVDD2>PVDD1, and since PVDD2 is greater than PVDD1, PVDD2 is a high-level signal, so that in the bias stage, a drain voltage of the drive transistor can be sufficiently raised, and time taken in the bias stage can be shortened. In other embodiments, PVDD2<PVDD1, it is suitable for a situation where a large current intensity is required and a large PVDD voltage needs to be applied in the light emitting stage to ensure the brightness of the light-emitting element. How to design depends on the specific situation.

In this embodiment, alternatively, the working process of the pixel circuit further includes at least one non-bias stage; in the bias stage, the drive transistor has a gate voltage of Vg1, a source voltage of Vs1 and a drain voltage of Vd1; and in the non-bias stage, the drive transistor has a gate voltage of Vg2, a source voltage of Vs2 and a drain voltage of Vd2, where $$|Vg1-Vd1|<|Vg2-Vd2|.$$

In this case, a reduction in the potential difference between the gate potential of the drive transistor T0 and the drain potential of the drive transistor T0 can alleviate the threshold voltage drift caused by the potential difference between the gate potential of the drive transistor T0 and the drain potential of the drive transistor T0 in the non-bias stage.

In addition, in some implementations of this embodiment, $$(Vg1-Vs1)\times(Vg2-Vs2)<0,\text{ or}$$

$$(Vg1-Vd1)\times(Vg2-Vd2)<0.$$

During the working process of the pixel circuit, if the first power supply signal PVDD is written into the drain of the drive transistor through the source of the drive transistor, the gate voltage and the drain voltage of the drive transistor satisfy (Vg1−Vd1)×(Vg2−Vd2)<0. In the non-bias stage, the gate voltage of the drive transistor is higher than the drain voltage of the drive transistor in the pixel circuit, that is, Vg2>Vd2, and then Vg2−Vd2>0. In the bias stage, the first power supply signal PVDD is written into the drain of the drive transistor, so that the gate voltage of the drive transistor is lower than the drain voltage of the drive transistor, that is, Vg1<Vd1, and then Vg1−Vd1<0. Then, (Vg1−Vd1)×(Vg2−Vd2)<0.

In other embodiments, alternatively, during the working process of the pixel circuit, if the first power supply signal PVDD is written into the source of the drive transistor through the drain of the drive transistor, the gate voltage and the drain voltage of the drive transistor satisfy (Vg1−Vs1)×(Vg2−Vs2)<0. In the non-bias stage, the gate voltage of the drive transistor is higher than the source voltage of the drive transistor in the pixel circuit, that is, Vg2>Vs2, and then Vg2−Vs2>0. In the bias stage, the first power supply signal PVDD is written into the source of the drive transistor, so that the gate voltage of the drive transistor is lower than the source voltage of the drive transistor, that is, Vg1<Vs1, and then Vg1−Vs1<0. Then, (Vg1−Vs1)×(Vg2−Vs2)<0.

In addition, alternatively, in this embodiment, the duration of the non-bias stage, such as the light emitting stage, of the display panel is relatively long; therefore, in order that the threshold voltage drift in the non-bias stage is sufficiently balanced in the bias stage and in order that the bias stage is prevented from consuming too much time, the following setting may be performed: Vd1−Vg1>Vg2−Vd2>0. In this manner, Vd1−Vg1 in the bias stage is sufficiently large so that the desired bias effect can be achieved in the bias stage as soon as possible. In other embodiments, if the source and the drain of the drive transistor are switched, the following setting may be performed: Vs1−Vg1>Vg2−Vs2>0, depending on the particular situation of the circuit.

Alternatively, in other implementations of this embodiment, the bias stage has a duration of t1, and the non-bias stage has a duration of t2.

$$(|Vg1-Vs1|-|Vg2-Vs2|)\times(t1-t2)<0, \text{ or}$$

$$(|Vg1-Vd1|-|Vg2-Vd2|)\times(t1-t2)<0.$$

In this embodiment, in the bias stage, the first power supply signal PVDD is written into the drain of the drive transistor through the source of the drive transistor, and in some embodiments, the drain voltage of the drive transistor may be greater than the gate voltage of the drive transistor, i.e., Vg1−Vd1<0. In the non-bias stage, the gate voltage of the drive transistor is higher than the drain voltage of the drive transistor, that is, Vg2−Vd2>0. When the drive transistor is biased, in response to a relatively large bias voltage, bias time may be appropriately reduced, and in response to a relatively small bias voltage, the bias time may be appropriately prolonged.

Based on this, if |Vg1−Vd|−|Vg2−Vd2|>0, it indicates that the bias voltage is relatively large, and in this case, the duration of the bias stage may be appropriately reduced, that is, t1<t2, so as to reduce the deviation between threshold voltages in the bias stage and the non-bias stage. If |Vg1−Vd1|−|Vg2−Vd2|<0, it indicates that the bias voltage is relatively small, and in this case, the duration of the bias stage may be appropriately prolonged, that is, t1>t2, so as to reduce the deviation between the threshold voltages in the bias stage and the non-bias stage.

In other embodiments, in the bias stage, the first power supply signal PVDD is written into the source of the drive transistor through the drain of the drive transistor, and the gate and the drain of the drive transistor in the bias stage and the gate and the drain of the drive transistor the non-bias stage satisfy (|Vg1−Vs1|−|Vg2−Vs2|)×(t1−t2)<0, thereby reducing the threshold voltage drift in the bias stage and the non-bias stage.

Alternatively, in this embodiment, the duration of the bias stage is greater than 5 microseconds and, in particular, may be greater than 20 microseconds. The inventors of the present disclosure have verified that when the duration of the bias stage is greater than 5 microseconds, especially greater than 20 microseconds, the threshold voltage drift can be effectively alleviated. In a case where the duration of the bias stage is less than 5 microseconds, the duration of the bias stage is so short that the bias state of the drive transistor T0 is not adjusted sufficiently, and the threshold voltage drift cannot be effectively alleviated.

Alternatively, the non-bias stage is one light emitting stage of the display panel. Exemplarily, in one light emitting stage, the drive transistor T0 has a source voltage of 4.6 V, a gate voltage of 3 V, and a drain voltage of 1 V, and the gate voltage of the drive transistor is higher than the drain voltage of the drive transistor. In the bias stage, the drive transistor is biased so that the threshold voltage drift of the drive transistor in the light emitting stage can be compensated.

Alternatively, within one frame of the display panel, the working process of the pixel circuit includes a pre-stage and the light emission stage, where within at least one frame, the pre-stage of the pixel circuit includes the bias stage.

In this embodiment, in a duration of one frame of the display panel, the working process of the pixel circuit includes a pre-stage and the light emitting stage. Within at least one frame of picture, the pre-stage of the pixel circuit includes the bias stage. In the bias stage, the first power supply signal is written into the drain of the drive transistor through the source of the drive transistor to adjust the drain potential of the drive transistor so as to achieve the bias of the drive transistor. In the non-bias stage such as the light emitting stage, there may be a case where the gate potential of the drive transistor is greater than the drain potential of the drive transistor, causing the threshold voltage of the drive transistor to increase, and in this case, a bias stage is added to the pixel circuit in the duration of the at least one frame so that the increase in the threshold voltage of the drive transistor in the non-bias stage can be at least partially balanced, thereby improving the display uniformity of the display panel.

Figure 8:
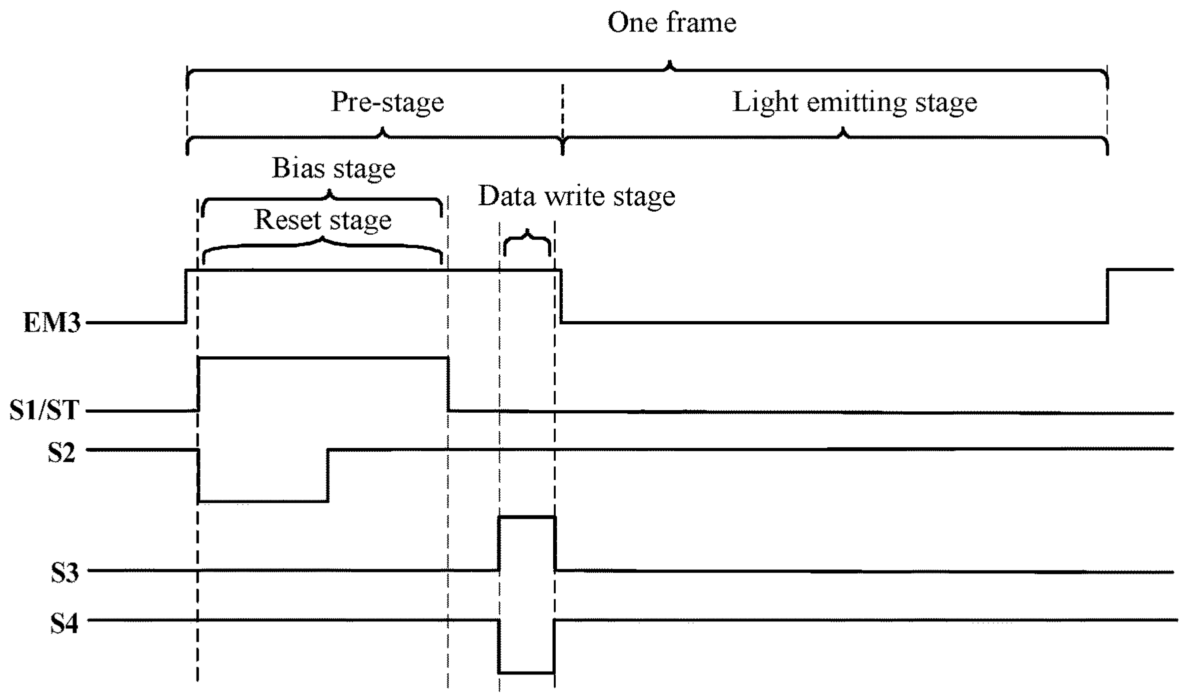
FIG. 8 is a first working timing diagram of a pixel circuit.

FIG. 8 is a first working timing diagram of a pixel circuit. Referring to FIG. 8 in combination with the pixel circuit shown in FIG. 6, alternatively, the control terminal of the reset module 17 is connected to the first scanning signal line S1, and the bias control signal ST and the first scanning signal S1 are a same signal. Here, the transistor T7 in the reset module and the transistor T1 in the first light emitting control sub-module are a same type of transistors, for example, both are the NMOS transistors or the PMOS transistors. On this basis, alternatively, the working process of the pixel circuit includes the reset stage and the bias stage. The reset stage and the bias stage are performed simultaneously.

In the bias stage and the reset stage, the third light emitting control signal EM3 outputs the invalid pulse so that the sixth transistor T6 and the third transistor T3 are turned off. The first scanning signal S1 outputs the valid pulse so that the seventh transistor T7 is turned on and the reset signal Vref is written into the gate of the drive transistor T0. The third scanning signal S3 outputs the invalid pulse so that the second transistor T2 is turned off. The fourth scanning signal S4 outputs the invalid pulse so that the fifth transistor T5 is turned off. Reset of the gate of the drive transistor T0 is achieved. Meanwhile, the first transistor T1 is turned on, and the first power supply signal PVDD is written into the drain of the drive transistor T0 so as to implement the bias of the gate voltage and the drain voltage of the drive transistor T0.

The reset stage and the bias stage are performed simultaneously so that the gate voltage of the drive transistor T0 is adjusted by the reset signal while the drain voltage of the drive transistor T0 is adjusted by the first power supply signal PVDD, and thus the gate voltage and the drain voltage of the drive transistor T0 are adjusted simultaneously, thereby improving the bias effect.

Figure 9:
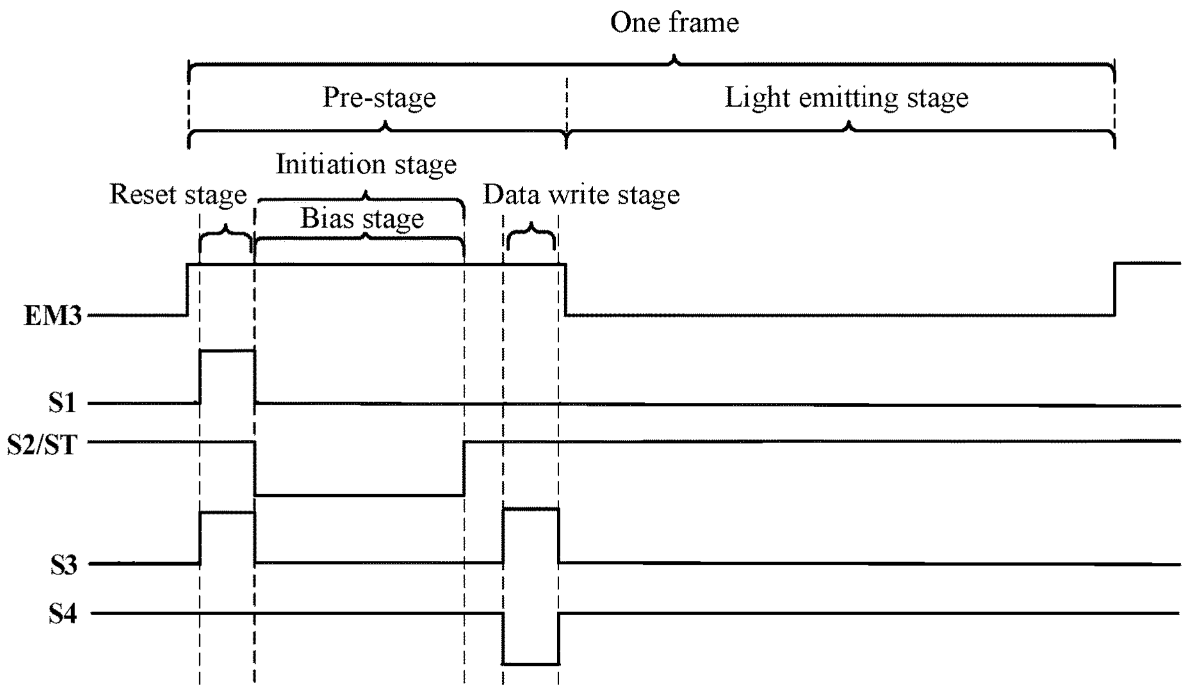
FIG. 9 is a second working timing diagram of a pixel circuit.

FIG. 9 is a second working timing diagram of a pixel circuit. Referring to FIG. 9 in combination with the pixel circuit shown in FIG. 7, alternatively, the pixel circuit further includes the initialization module 15, and in at least part of a time period of the bias stage, the initialization module 15 is on. Part of the time period of the bias stage is multiplexed as the initialization stage. Alternatively, the second scanning signal S2 outputs the valid pulse so that the fourth transistor T4 is turned on, and then the initialization module 15 provides the initialization signal Vini to the light-emitting element 20.

Alternatively, the bias control signal ST and the second scanning signal S2 are a same signal. Alternatively, the working process of the pixel circuit includes the initialization stage and the bias stage. The initialization stage and the bias stage are performed simultaneously. That is, the entire time period of the bias stage is synchronized with the initialization stage.

The initialization stage and the bias stage are performed simultaneously so that it can be ensured that the light-emitting element 20 receives the initialization signal. Since in the bias stage, the data signal is written into the drain of the drive transistor T0, a certain leakage current may exist in the transistor although T3 is off. Therefore, if the light-emitting element 20 does not receive the initialization signal, the light-emitting element 20 may be at the risk of emitting light covertly in the bias stage. In this case, in the bias stage, the light-emitting element 20 is initialized so that it can be ensured that the light-emitting element does not emit light.

In other embodiments, as shown in FIG. 8, alternatively, part of the time period of the reset stage may be multiplexed as the initialization stage. In a case where no interference is generated among the reset, bias and initialization, related practitioners may reasonably set a reset timing, a bias timing and an initialization timing.

Figure 10:
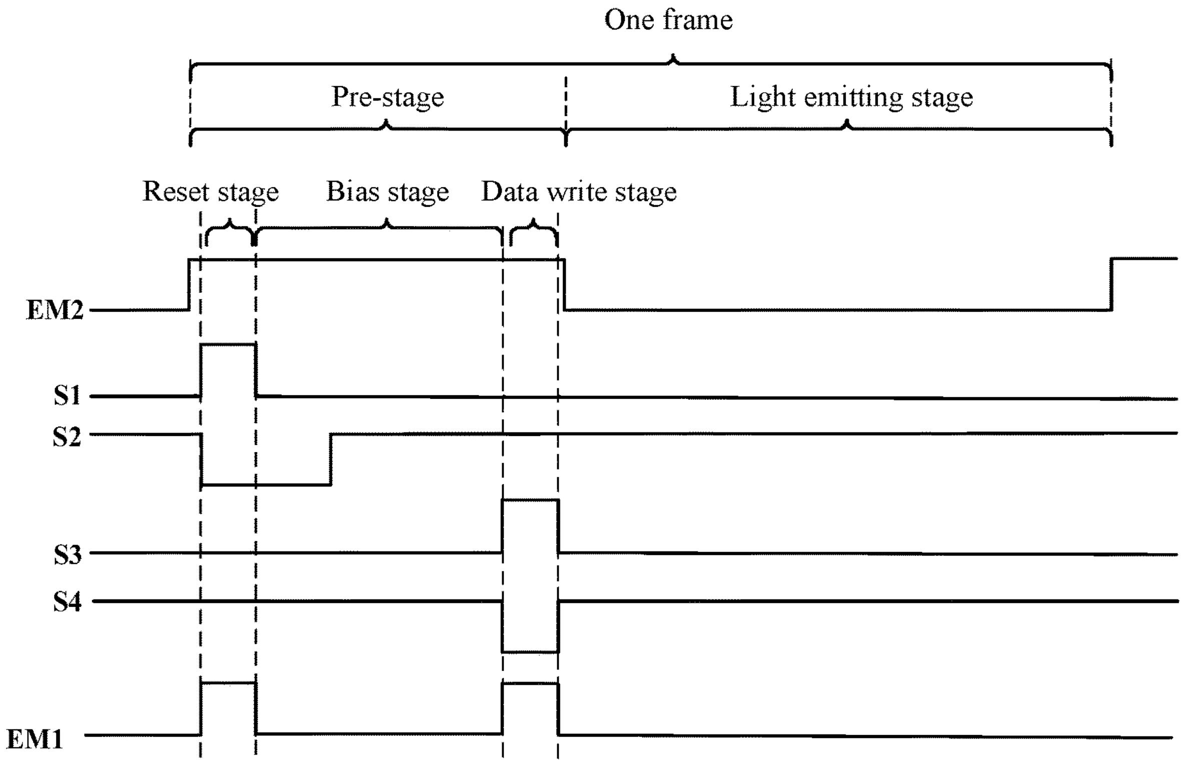
FIG. 10 is a third working timing diagram of a pixel circuit.

FIG. 10 is a third working timing diagram of a pixel circuit. Referring to FIG. 10 in combination with the pixel circuit shown in FIG. 3, alternatively, the pre-stage includes the reset stage and the bias stage. In the reset stage, the gate of the drive transistor receives the reset signal and the reset is performed.

In the reset stage, the scanning signal S1 outputs a high-level pulse to allow the seventh transistor T7 to be on, the first transistor T1 is off, and the reset signal Vref is written into the gate of the drive transistor T0, so that the gate of the drive transistor T0 is reset to a negative potential which is less than 0 V. In the bias stage, the scanning signal S1 outputs a low-level pulse to allow the seventh transistor T7 to be off, and the signal EM1 changes to a low-level signal to allow the first transistor T1 to be on, in which case, the second transistor T2 is off, and then the first power supply signal PVDD is written into the drain of the drive transistor T0 to implement the bias of the drive transistor.

Alternatively, the bias stage has a duration of t1, and the reset stage has a duration of t3, where t1>t3.

The reset stage is used only for writing the reset signal to the gate of the drive transistor so that the gate of the drive transistor is reset to the negative potential which is less than 0 V, and thus the duration t3 of the reset stage may be shorter. In the bias stage, the first power supply signal is written into the drain of the drive transistor, and the drive transistor is biased to reduce the threshold voltage drift of the drive transistor in the light emitting stage. Since the duration of the light emitting stage is longer, the duration t1 of the bias stage is longer so as to fully reduce the threshold voltage drift of the non-bias stage. Based on this, t1>t3 is set.

As shown in FIG. 10, alternatively, at an end of the reset stage, the gate of the drive transistor is disconnected from the reset signal; meanwhile, the first light emitting control module is turned on, and the pixel circuit enters the bias stage. In this embodiment, at the end of the reset stage of the pixel circuit, the first light emitting control module is turned on to enter the bias stage, so that there is no time interval between the reset stage and the bias stage, ensuring the pre-stage of the pixel circuit to be shortened as much as possible, thereby reducing the duration of one frame of the display panel.

Figure 11:
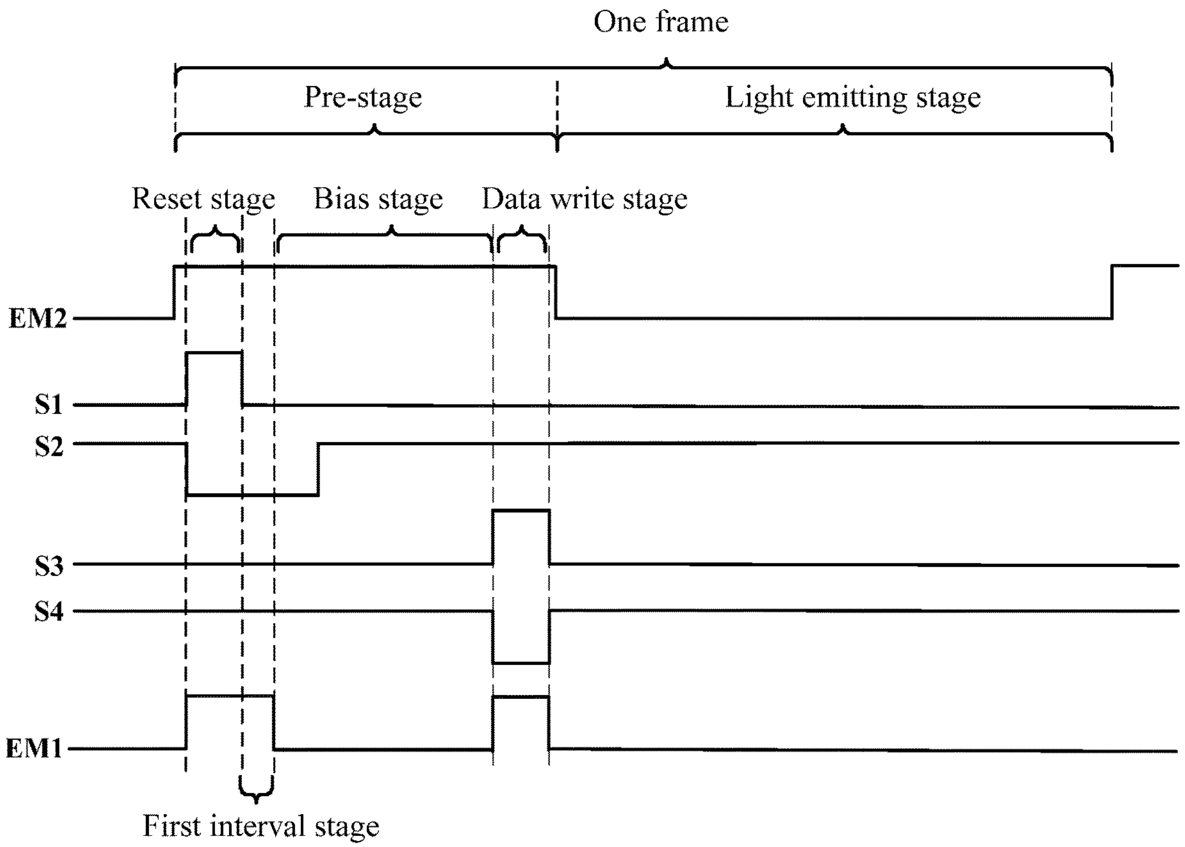
FIG. 11 is a fourth working timing diagram of a pixel circuit.

FIG. 11 is a fourth working timing diagram of a pixel circuit. Referring to FIG. 11, alternatively, between an end of the reset stage and a start of the bias stage, the pre-stage further includes a first interval stage in which the gate of the drive transistor is disconnected from the reset signal and the first light emitting control module is off. In this embodiment, in the first interval stage, the scanning signal S3 hops from a high level to a low level so that the seventh transistor T7 is off and the gate of the drive transistor is disconnected from the reset signal; and the first light emitting control signal EM1 maintains at a high level so that the first light emitting control module is off. Therefore, in the first interval stage, the drive transistor can have a stable period. At the end of the first interval stage, the first light emitting control signal EM1 hops to a low-level signal so that the first light emitting control module is turned on, and the pixel circuit enters the bias stage. After the reset stage, the drive transistor is stabilized by the first interval stage and then enters the bias stage, so that the stability of the pixel circuit can be improved.

Alternatively, the bias stage has a duration of t1, the reset stage has a duration of t3, and the first interval stage has a duration of t4, where t1>t4, or t3>t4. It is understandable that the reset stage is used only for reset of the gate voltage of the drive transistor, and the first interval stage is used for stabilization of the drive transistor, and thus the duration t3 of the reset stage and the duration t4 of the first interval stage can be as short as a response time length. Therefore, it is set t1>t4, or t3>t4.

Figure 12:
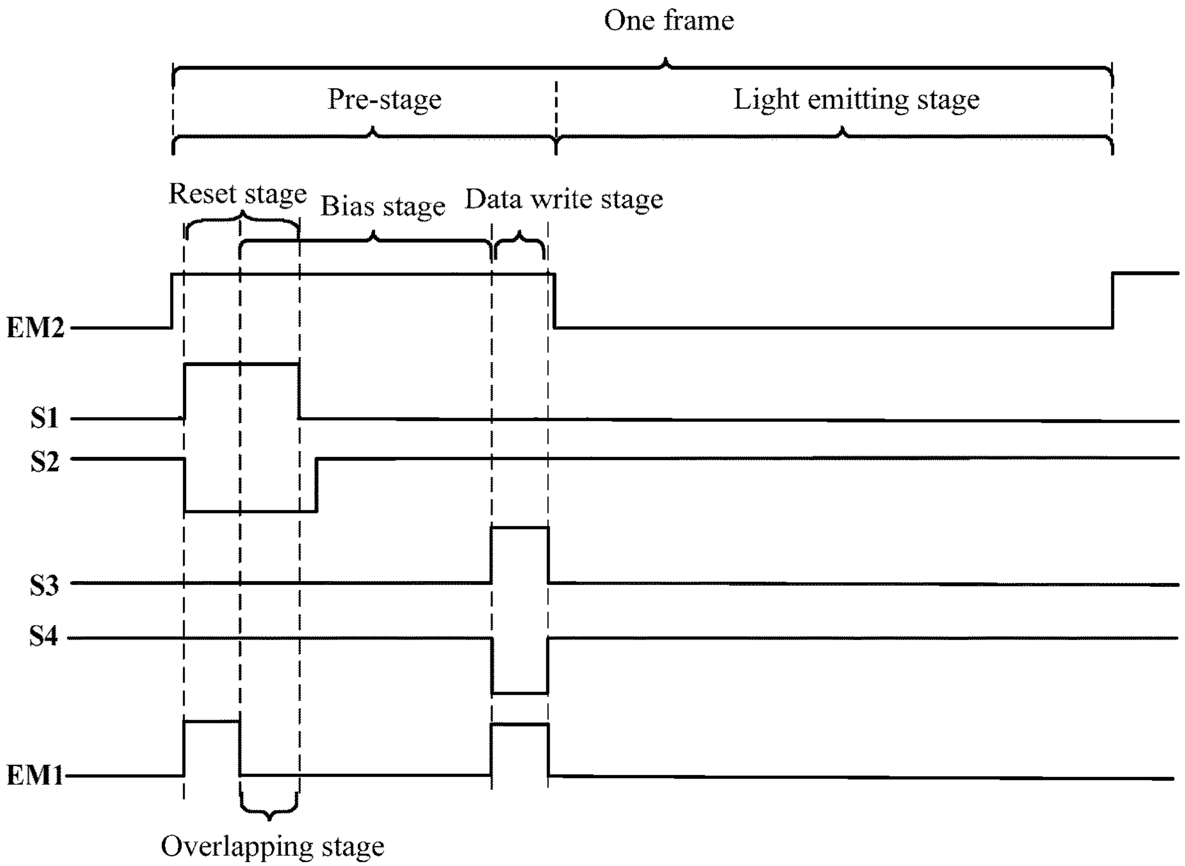
FIG. 12 is a fifth working timing diagram of a pixel circuit.

FIG. 12 is a fifth working timing diagram of a pixel circuit. Referring to FIG. 12, alternatively, the time period of the reset stage at least partially overlaps the time period of the bias stage. For the pixel circuit shown in FIG. 3, the reset module 17 is directly connected to the gate of the drive transistor T0 and the first power supply signal is written into the drain of the drive transistor in the bias stage. In a case where the second transistor T2 is off, operations in the reset stage and the bias stage does not affect each other. Based on this, alternatively, the time period of the reset stage at least partially overlaps the time period of the bias stage.

In the reset stage, the second transistor T2 is off, the seventh transistor T7 is on, and the reset signal Vref is written into the gate of the drive transistor T0. In the overlapping stage in which the bias stage overlaps the reset signal, the second transistor T2 is off, the first transistor T1 is on, and the first power supply signal is written into the drain of the drive transistor TO; meanwhile, the seventh transistor T7 is on, and the reset signal Vref is continuously written into the gate of the drive transistor T0, so that the gate voltage of the drive transistor T0 can be stabilized. In the bias stage, the reset stage is performed so that the drain potential of the drive transistor T0 is adjusted through the first power supply signal while the gate potential of the drive transistor T0 is adjusted through the reset signal, and thus the gate voltage and the drain voltage of the drive transistor are adjusted simultaneously, thereby improving the bias effect.

Figure 13:
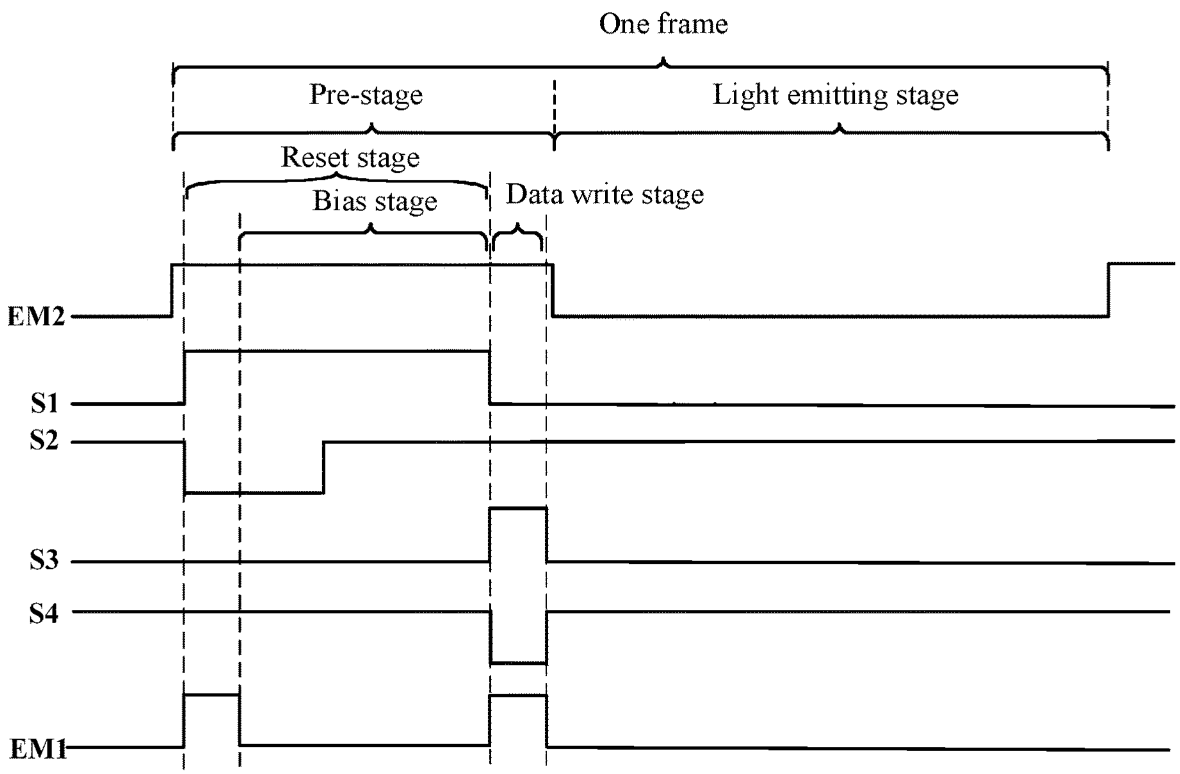
FIG. 13 is a sixth working timing diagram of a pixel circuit.

FIG. 13 is a sixth working timing diagram of a pixel circuit. Referring to FIG. 13, alternatively, in the bias stage, the gate of the drive transistor remains to receive the reset signal. In the bias stage, the second transistor T2 is off, the first transistor T1 is on, the seventh transistor T7 is on, and the first power supply signal is written into the drain of the drive transistor TO; meanwhile, the reset signal Vref is continuously written into the gate of the drive transistor T0 so that the gate voltage of the drive transistor T0 can be stabilized in the bias stage. In addition, the reset stage overlaps the bias stage, thus shortening the duration of the pre-stage of the pixel circuit and achieving the high-frequency display. Alternatively, a starting time of the reset stage is earlier than or the same as a start of the bias stage, and an ending time of the reset stage is later than or the same as an end of the bias stage.

Figure 14:
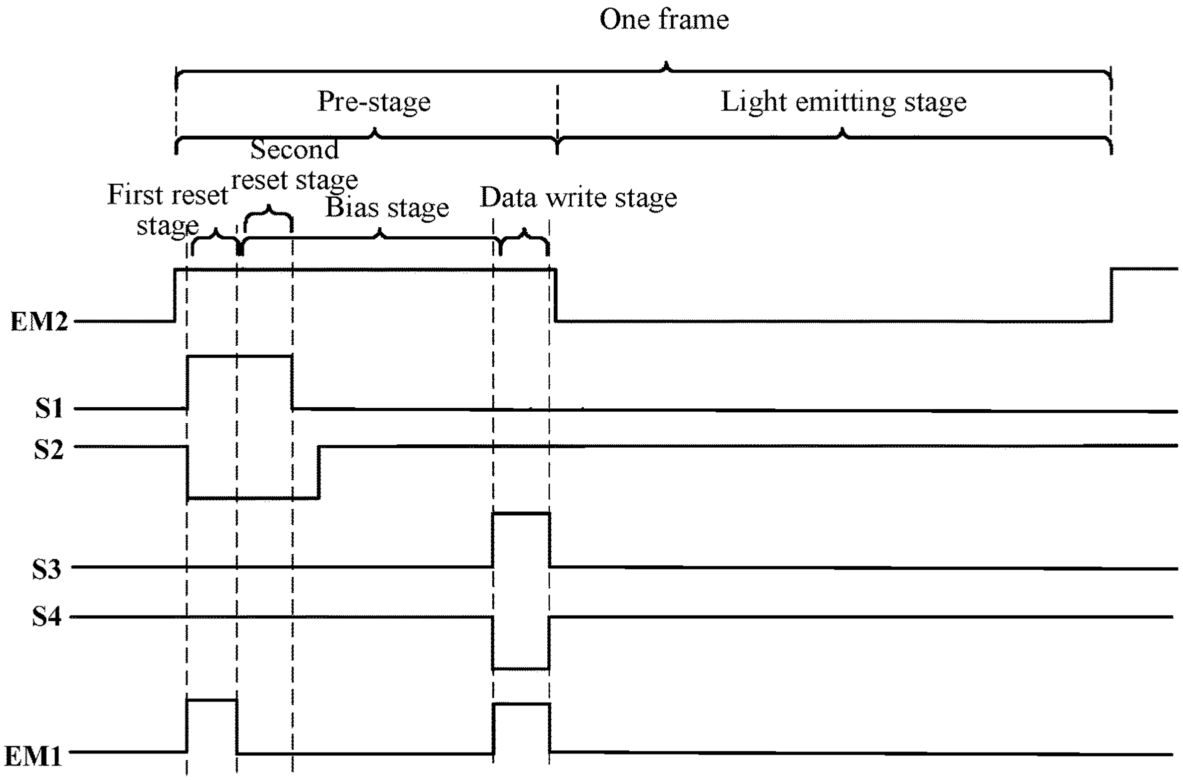
FIG. 14 is a seventh working timing diagram of a pixel circuit.

FIG. 14 is a seventh working timing diagram of a pixel circuit. Referring to FIG. 14, alternatively, the reset stage includes a first reset stage and a second reset stage. In the first reset stage whose time period does not overlap the time period of the bias stage, the gate of the drive transistor receives a first reset signal; in at least part of the time period of the bias stage, the gate of the drive transistor receives a second reset signal, and the time period of the bias stage at least partially overlaps a time period of the second reset stage. The first reset stage may be configured to reset the gate potential of the drive transistor. In some cases, the gate potential of the drive transistor T0 may be lower than 0 V. The second reset stage may be configured to stabilize the gate potential of the drive transistor in the bias stage so that bias adjustment of the drive transistor is achieved. Alternatively, part of the time period of the bias stage overlaps the time period of the second reset stage, or alternatively, the entire time period of the bias stage overlaps the time period of the second reset stage.

Alternatively, the first reset signal and the second reset signal have a same potential. Alternatively, alternatively, the first reset signal and the second reset signal have different potentials. The first reset signal needs to play a role of pulling down the gate potential of the drive transistor, so that the first reset signal is less than 0 V. The second reset signal needs to play the role of stabilizing the gate potential of the drive transistor in the bias stage to increase the bias effect. Based on this, the second reset signal may be the same as or different from the first reset signal. Related practitioners may flexibly design the pixel circuit to satisfy different design requirements.

Alternatively, an absolute value of the potential of the first reset signal is greater than an absolute value of the potential of the second reset signal. The drive transistor is a PMOS transistor, and the potential of the first reset signal is lower than the potential of the second reset signal; or the drive transistor is an NMOS transistor, and the potential of the first reset signal is higher than the potential of the second reset signal. Alternatively, the absolute value of the potential of the first reset signal is greater than the absolute value of the potential of the second reset signal so that in addition to achieving the bias function in the bias stage, the second reset signal having a lower potential absolute value can reduce the power consumption of the pixel circuit.

In another implementation, alternatively, an absolute value of the potential of the first reset signal is greater than an absolute value of the potential of the second reset signal. The drive transistor is a PMOS transistor, and the potential of the second reset signal is lower than the potential of the first reset signal; or the drive transistor is an NMOS transistor, and the potential of the second reset signal is higher than the potential of the first reset signal. Alternatively, the absolute value of the potential of the first reset signal is less than the absolute value of the potential of the second reset signal. In a particular case of the display panel, for example, in the case of high-frequency driving, in the reset stage, the level of the first reset signal is a negative potential whose absolute value is relatively small so that the duration of the data writing stage can be shortened, thereby facilitating high-frequency driving.

Figure 15:
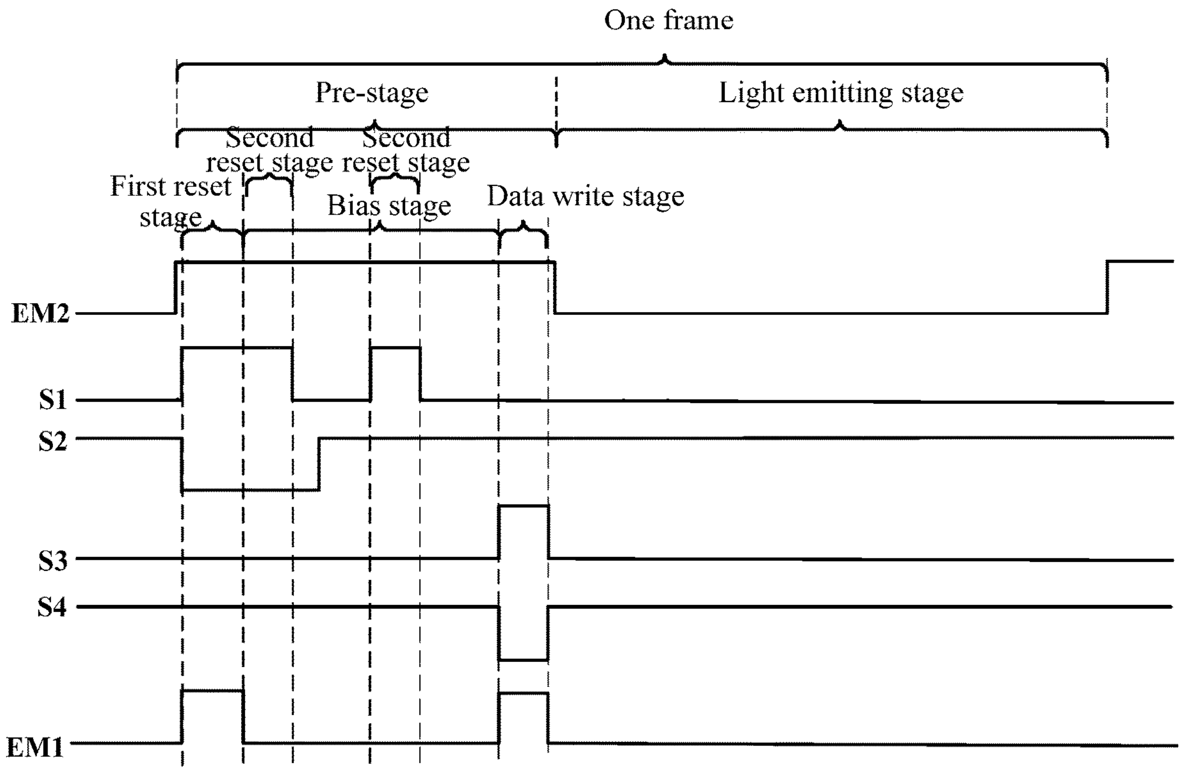
FIG. 15 is an eighth working timing diagram of a pixel circuit.

FIG. 15 is an eighth working timing diagram of a pixel circuit. Referring to FIG. 15, alternatively, in the bias stage, two second reset stages exist, and between adjacent second reset stages, the gate of the drive transistor is disconnected from the reset signal. In this embodiment, in the bias stage, multiple second reset stages may be designed, and each second reset stage can reset the gate potential of the drive transistor, and stabilize the gate potential of the drive transistor in the bias stage, which facilitates achieving the bias adjustment of the drive transistor, thereby further improving the bias effect.

Alternatively, as shown in FIGS. 14 and 15, before the bias stage ends, the gate of the drive transistor is disconnected from the reset signal, and then the bias stage ends. Before the bias phase ends, the seventh transistor T7 is turned off so that the gate of the drive transistor is disconnected from the reset signal, and then the bias phase ends. In this way, the drain of the drive transistor may also receive the first power supply signal after the reset stage ends, thus ensuring the bias effect of the drive transistor.

In addition, alternatively, as shown in FIG. 13, at the time when the bias stage ends, the gate of the drive transistor is disconnected from the reset signal. In this embodiment, the entire time period of the bias stage overlaps the time period of the reset stage, the start of the reset stage is earlier than or the same as the start of the bias stage, and the end of the reset stage is later than or the same as the end of the bias stage. For example, in some implementations, after the bias stage ends, the gate of the drive transistor is then disconnected from the reset signal. As described above, the reset signal is continuously written into the gate of the drive transistor in the reset stage and the bias stage, thereby ensuring the stability of the gate voltage of the drive transistor before the data writing stage and improving the bias effect.

Alternatively, as shown in FIGS. 3 to 7, in this embodiment, the pixel circuit 10 further includes the data writing module 16 which is configured to selectively provide the data signal for the drive module 12. Alternatively, in this embodiment, the pre-stage includes the bias stage and the data writing stage. In the data writing stage, the data writing module 16, the drive module 12 and the compensation module 13 are all on, and the data signal is written into the gate of the drive transistor T0. In the data writing stage, the fifth transistor T5, the drive transistor T0 and the second transistor T2 are all on, and the data signal is written into a control terminal of the drive module 12, i.e., the gate of the drive transistor T0, through the data writing module 16, the drive module 12 and the compensation module 13 which are on.

Alternatively, the bias stage has a duration of t1, and the data writing stage has a duration of t5, where t1>t5. It is understandable that the data writing stage is merely used for writing the data signal to the gate of the drive transistor, and thus a response time length is sufficient. In the bias stage, the first power supply signal is written into the drain of the drive transistor, and the drive transistor is biased to reduce the threshold voltage drift of the drive transistor in the light emitting stage. Since the duration of the non-bias stage such as the light emitting stage is relatively longer, the duration t1 of the bias stage is increased, so as to fully reduce the threshold voltage drift in the non-bias stage. Based on this, t1>t5 is set.

Figure 16:
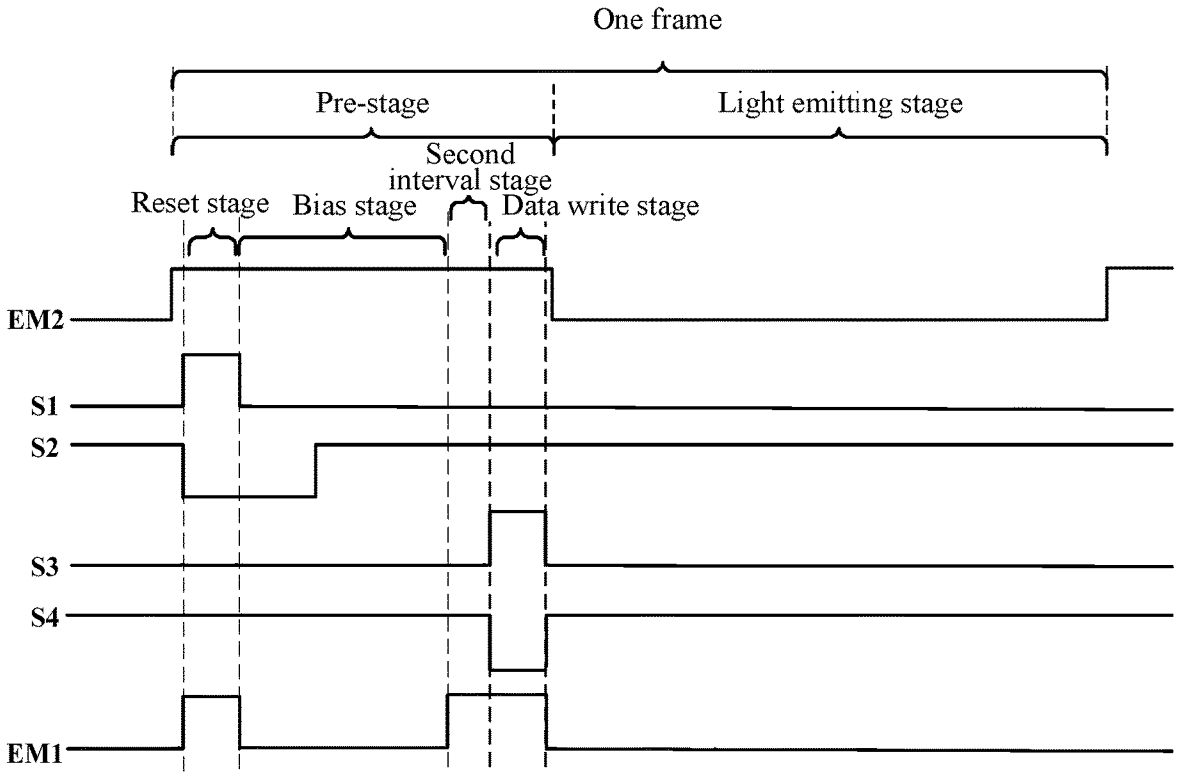
FIG. 16 is a ninth working timing diagram of a pixel circuit.

FIG. 16 is a ninth working timing diagram of a pixel circuit. Referring to FIG. 16, alternatively, from an end of the bias stage to a start of the data writing stage, the pixel circuit comprises a second interval stage in which the first light emitting control module is off and the data writing module is off. In this embodiment, in the second interval stage, the first light emitting control signal EM1 hops from a low level to a high level so that the first transistor T1 is off and the drain of the drive transistor is disconnected from the first power supply signal. At the same time, the data writing module is off. Therefore, in the second interval stage, the drive transistor can have a stable period. At the end of the second interval stage, the first light emitting control signal EM1 maintains at a high level so that the first transistor T1 is off, and the pixel circuit enters the data writing stage. After the bias stage, the drive transistor is stabilized by the second interval stage and then enters the data writing stage, so that the stability of the pixel circuit can be improved.

Alternatively, the bias stage has a duration of t1, the data writing stage has a duration of t5, and the second interval stage has a duration of t6, where t1>t5, or t5>t6. It is understandable that the data writing stage is used only for writing the data signal to the gate of the drive transistor and the second interval stage is used for stabilization of the drive transistor, and thus the duration t5 of the data writing stage and the duration t6 of the second interval stage can be as short as a response time length. Therefore, it is set t1>t6 or t5>t6.

In addition, in this embodiment, as shown in FIGS. 10 to 15, alternatively, when the bias stage ends, the first light emitting control module is turned off, the data writing module is turned on, and the pixel circuit enters the data writing stage. In this embodiment, when the bias stage ends, the first light emitting control module is turned off so that the first power supply signal is not written into the source of the drive transistor. At the same time, the data writing module is turned on, the pixel circuit enters the data writing stage, and the data signal is written into the drain of the drive transistor through the source of the drive transistor. Then the first light emitting control module is off in the data writing stage to prevent the first power supply signal from affecting the data writing process. In addition, this manner may also fully shorten the duration of the pre-stage on the premise of ensuring the duration of the bias stage, thus facilitating the implementation of high-frequency display.

Alternatively, in this embodiment, referring to FIGS. 6 and 10 to 16, the pixel circuit further includes the data writing module which is configured to selectively provide the data signal to the drive module. The pre-stage includes the reset stage, the bias stage and the data writing stage in sequence. In the reset stage, the gate of the drive transistor receives the reset signal and the reset is performed. In the data writing stage, the data writing module, the drive module and the compensation module are all on, and the data signal is written into the gate of the drive transistor.

In this embodiment, in the pre-stage of the pixel circuit, first the gate of the drive transistor is first reset so that the gate voltage of the drive transistor is pulled down to a negative voltage lower than 0 V, thereby facilitating subsequent biasing of the drive transistor; then the first power supply signal is written into the drain of the drive transistor to bias the drive transistor so as to reduce the threshold voltage drift of the drive transistor in the non-bias stage; and finally, in the data writing stage, the data writing module, the drive module and the compensation module are all turned on, and the data signal is written into the gate of the drive transistor.

Alternatively, the bias stage has a duration of t1, the reset stage has a duration of t3, and the data writing stage has a duration of t5, where t1>t3, and t1>t5. In the duration of one frame, since the threshold voltage of the drive transistor is caused to drift in the non-bias stage and the duration of the non-bias stage is relatively long, to reduce the threshold voltage drift of the drive transistor in the non-bias stage, the duration of the bias stage is set to be relatively long; since the data writing stage is used only for writing the data signal to the gate of the drive transistor, the duration of the data writing stage is set to be relatively short; and since the reset stage is used only for writing the reset signal to the gate of the drive transistor, the duration of the reset stage is set to be relatively short. Based on this, it is set t1>t3 and t1>t5.

Figure 17:
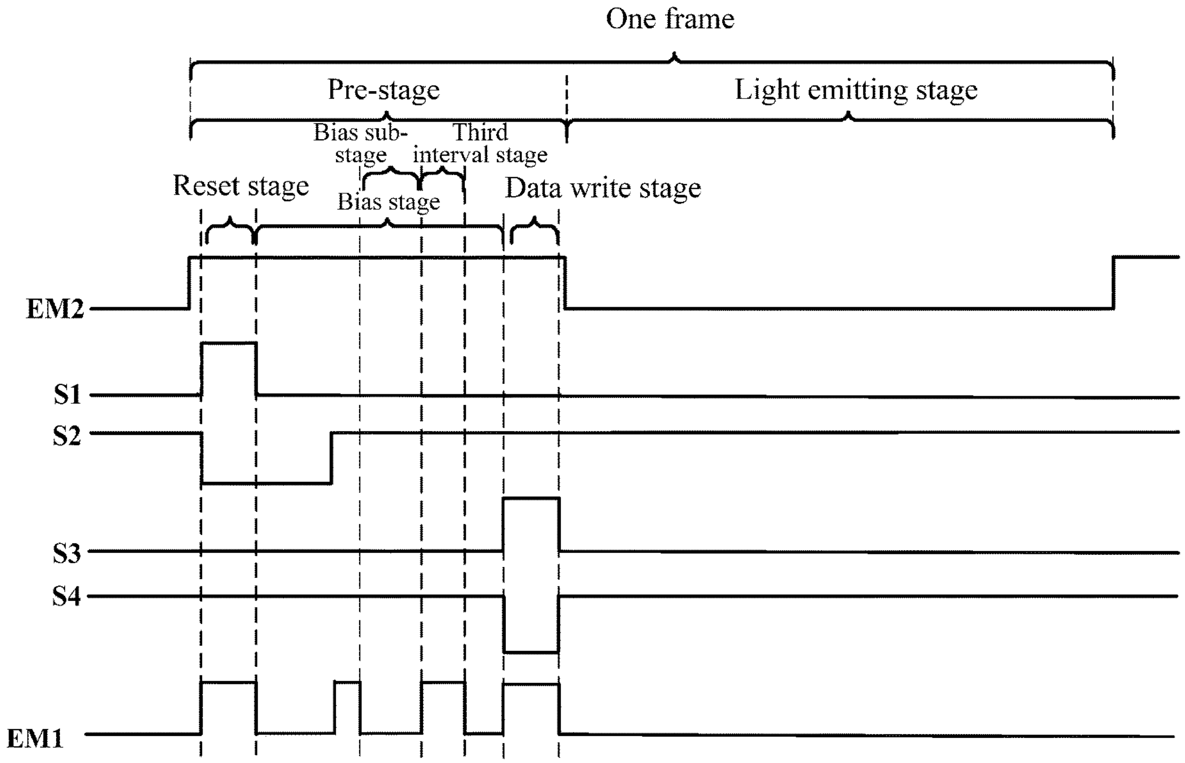
FIG. 17 is a tenth working timing diagram of a pixel circuit.

FIG. 17 is a tenth working timing diagram of a pixel circuit. Referring to FIG. 17, exemplary, on the basis of any of the above embodiments, alternatively, the bias stage includes m bias sub-stages in sequence, where m 1; and among the m bias sub-stages, the interval between two adjacent bias sub-stages is a third interval stage in which the first light emitting control module is off.

As shown in FIG. 17, alternatively, the bias stage includes at least two bias sub-stages in sequence, and an interval between adjacent two bias sub-stages is a third interval stage. In each bias sub-stage, the first light emitting control module is on, and the first power supply signal is written into the drain of the drive transistor. In each third interval stage, the first light emitting control module is off. Specifically, in each bias sub-stage, the first light emitting control signal EM1 outputs a valid pulse signal so that the first light emitting control module is on, and the first power supply signal is written into the drain of the drive transistor through the first light emitting control module and the drive module in sequence to implement the bias of the drive transistor. In each third interval stage, the first light emitting control signal EM1 outputs an invalid pulse signal so that the first light emitting control module is off and the first power supply signal is disconnected from the drain of the drive transistor. The bias stage includes multiple bias sub-stages, then each bias sub-stage can reduce the threshold voltage drift of the drive transistor in the non-bias stage, and through the multiple bias sub-stages, the threshold voltage drift of the drive transistor caused in the non-bias stage can be fully reduced, further improving the bias effect.

In other embodiments, alternatively, as shown in FIG. 11, the bias stage includes one bias sub-stage, that is, a bias stage. In this bias stage, the first light emitting control module is normally on.

Alternatively, the bias stage includes at least two third interval stages, and the at least two third interval stages have different durations. Alternatively, durations of third interval stages increase or decrease sequentially with the m bias sub-stages. Alternatively, a duration of at least one third interval stage is shorter than a duration of at least one bias sub-stage, each third interval stage is a transition stage between the bias sub-stages, and thus, the duration of the transition stage may be shorter than the duration of a bias sub-stage. Especially, the duration of any one of the at least two third interval stages is shorter than the duration of any one of the m bias sub-stages. It is understandable that the durations of the multiple third interval stages may be the same or different, or the durations of the multiple third interval stages satisfy an increasing rule, a decreasing rule, or the like. In the embodiments of the present disclosure, the bias stage of the pixel circuit is flexibly designed according to the bias requirements of the pixel circuit in different cases, which is not limited by the embodiments of the present disclosure.

Alternatively, at least two of the m bias sub-stages have different durations. Alternatively, a duration of a first one of the m bias sub-stages is longer than a duration of each of the other ones of the m bias sub-stages. Alternatively, durations of the m bias sub-stages decrease sequentially with the m bias sub-stages. It is understandable that the durations of the multiple bias sub-stages may be the same or different, or the durations of the multiple bias sub-stages satisfy an increasing rule, a decreasing rule, or the like. In the embodiments of the present disclosure, the bias stage of the pixel circuit is flexibly designed according to the bias requirements of the pixel circuit in different cases, which is not limited by the embodiments of the present disclosure.

In the case where the duration of the first one of the m bias sub-stage is longer than the duration of each of the other ones of the m bias sub-stages, in the bias stage, the drive transistor is biased in the first bias sub-stage so that the threshold voltage drift of the drive transistor in the non-bias stage can be effectively alleviated; subsequently, dynamical bias adjustment is performed according to the bias situation by other bias sub-stages of a shorter duration so that the threshold voltage drift of the drive transistor in the non-bias stage can be sufficiently alleviated by the multiple bias sub-stages, thereby ensuring that the duration of the bias stage is not too long.

Alternatively, in conjunction with FIGS. 17 and 16, the duration of at least one third interval stage is not equal to the duration of one second interval stage. One third interval stage is a time interval between any two adjacent bias sub-stages, and one second interval stage is a time interval between the bias stage and the data writing stage, so the duration of one second interval stage and the duration of one third interval stage may be set flexibly according to a particular situation. In some embodiments, the duration of one second interval stage is greater than the duration of one third interval stage. In other embodiments, the duration of one second interval stage may be less than the duration of one third interval stage.

Exemplarily, on the basis of the above embodiments, alternatively, one data writing cycle of the display panel includes S refreshing frames which include a data write frame and a retention frame, where S>0 and at least the data write frame includes a bias stage. In the data write frame, new display data is written into the pixel circuit. In the retention frame, the pixel circuit is normally refreshed, but the display data of the previous frame is retained, and no new display data is written. In the duration of the data write frame, in the bias stage, the first light emitting control module and the drive module are on, the compensation module is off, and the first power supply signal is written into the drain of the drive transistor from the source of the drive transistor to bias the voltage between the gate and the drain of the drive transistor is biased.

Figure 18:
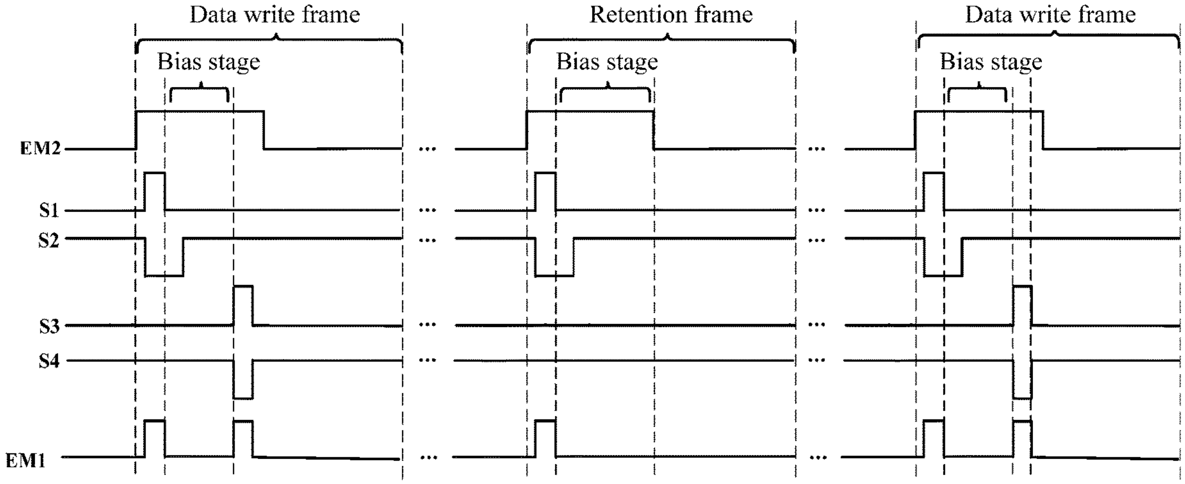
FIG. 18 is an eleventh working timing diagram of a pixel circuit.

FIG. 18 is an eleventh working timing diagram of a pixel circuit. Referring to FIG. 18, in this embodiment, alternatively, at least one data write frame and at least one retention frame each include a bias stage, and the duration of the bias stage in the at least one retention frame is longer than the duration of the bias stage in the at least one data write frame. In the duration of the at least one retention frame, in the bias stage, the first light emitting control module and the drive module are on, the compensation module is off, and the first power supply signal is written into the drain of the drive transistor from the source of the drive transistor to bias the voltage between the gate and the drain of the drive transistor. In the retention frame, the previous frame is displayed, the data writing stage is not included, a time period, in which the first light emitting control module is on, the compensation module is off and the second light emitting control module is off, is the bias stage, and thus, a longer duration can be used for bias adjustment. In the data write frame, a new frame is displayed, and thus the normal duration of the light emitting stage of the data write frame needs to be ensured. Based on this, alternatively, the duration of the bias stage in at least one retention frame is longer than the duration of the bias stage in the data write frame so that a better bias effect can be achieved on the premise that displaying is ensured.

Figure 19:
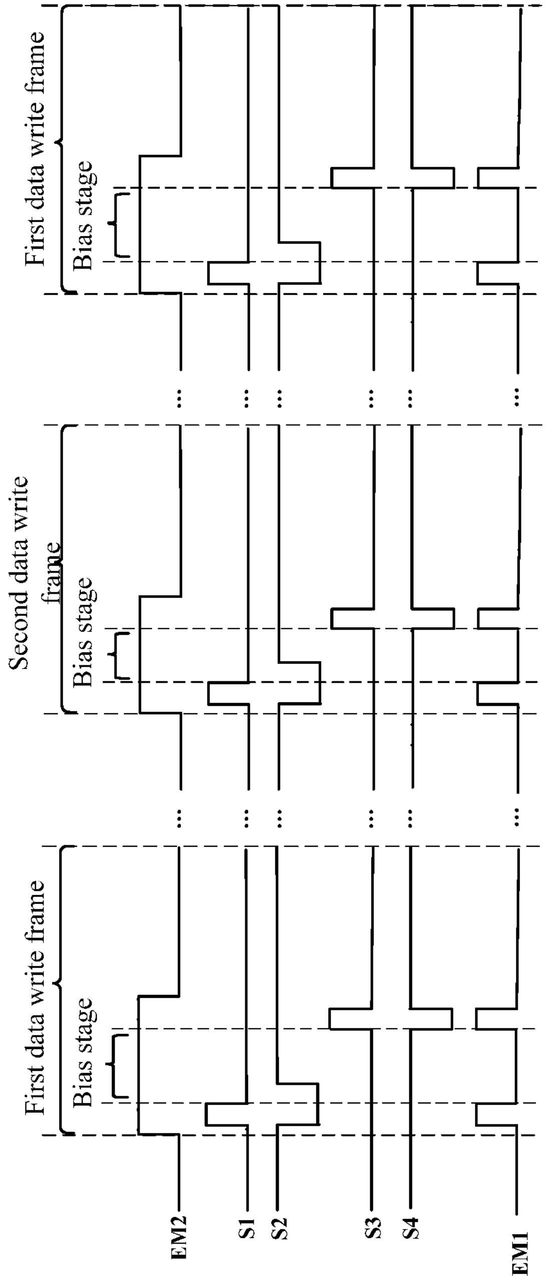
FIG. 19 is a twelfth working timing diagram of a pixel circuit.

FIG. 19 is a twelfth working timing diagram of a pixel circuit. Referring to FIG. 19, alternatively, the display panel includes at least two data write frames. In the at least two data write frames, bias stages have different durations. Alternatively, the display panel includes first data write frames and second data write frames, n second data write frames are included between two adjacent first data write frames, where $n \geq 1$; and in the first data write frame, the bias stage has a duration of t7, and in the second data write frame, the bias stage has a duration of t8, where t7>t≥0.

The display panel displays multiple second data write frames. In each second data write frame, the duration of the bias stage is t8; and in the bias stage, the voltage between the gate and the drain of the drive transistor can be biased to alleviate the threshold voltage drift of the drive transistor. In practical application, the threshold voltage drift of the drive transistor cannot be sufficiently alleviated by the bias stage of the second data write frame, and thus, after the display panel displays multiple second data write frames, the long-term accumulation may still cause changes in the internal characteristics of the driving transistor. Based on this, the duration of the bias stage in each first data write frame is set to t7, and the duration of the bias stage in the each first data write frame is increased so that the threshold voltage drift of the drive transistor accumulated until the current frame is alleviated. In this way, the display effect is improved, and thus the display uniformity is improved.

In some embodiments, the second data write frame may not include a bias stage, that is, t8=0. In this case, not all data write frames require a bias stage, and a bias stage may be set in only the first data write frame, thereby simplifying the driving process of the display panel.

Figure 20:
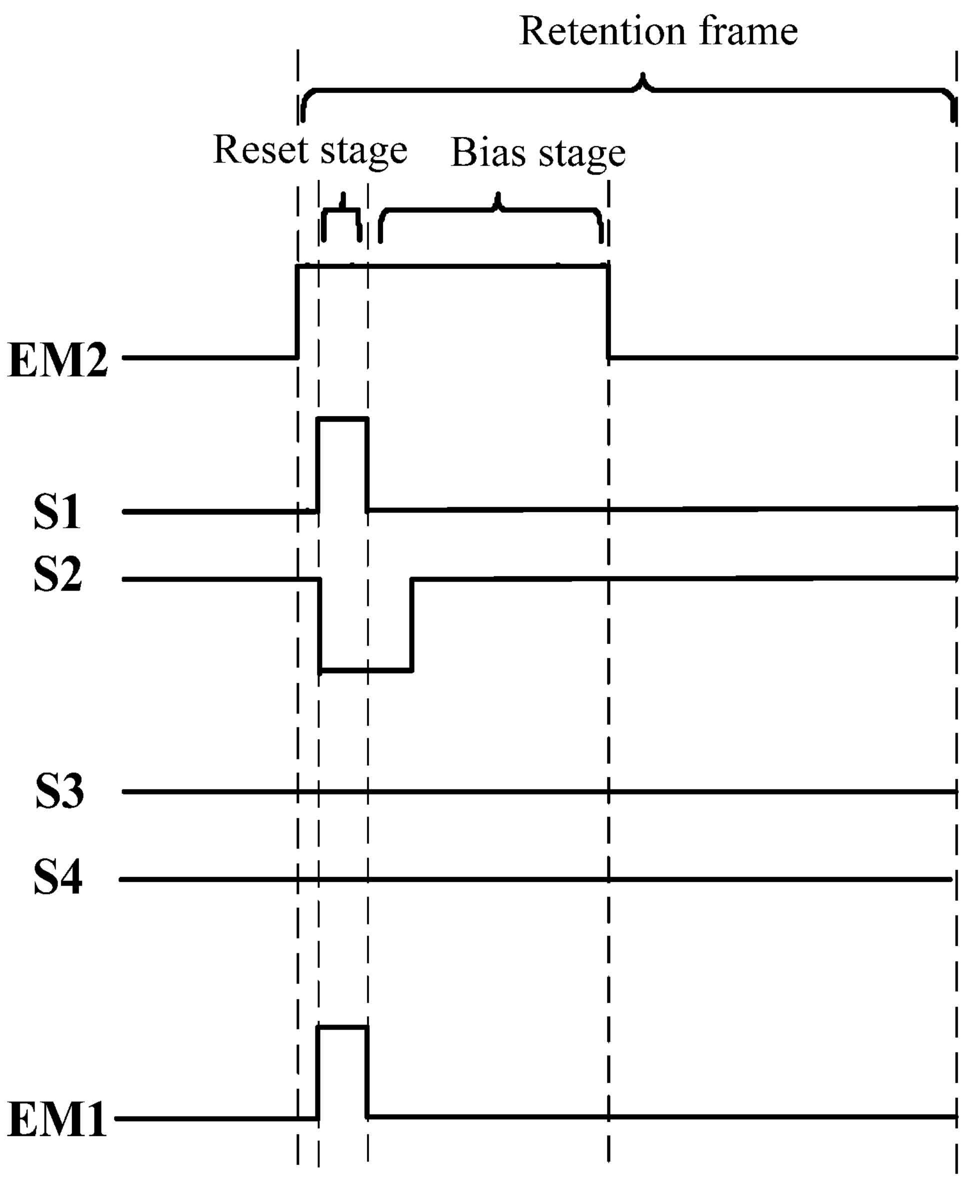
FIG. 20 is a thirteen working timing diagram of a pixel circuit.

FIG. 20 is a thirteen working timing diagram of a pixel circuit. Referring to FIG. 20, one data writing cycle of the display panel includes S refreshing frames that include a data write frame and a retention frame, where S>0, and at least one retention frame includes a bias stage. In this embodiment, in the at least one retention frame, the pixel circuit is normally refreshed, but the display data of the previous frame is retained. The at least one retention frame does not include a data writing stage, and the previous frame is displayed in the at least one retention frame. In the duration of the at least one retention frame, in the bias stage, the first power supply signal is written into the drain of the drive transistor from the source of the drive transistor to bias the voltage between the gate and the drain of the drive transistor. After the bias stage ends, the at least one retention frame directly enters the light emitting stage so that the previous frame is displayed. In this way, the duration of the pre-stage of the retention frame can be shortened, and thus the working duration of the retention frame can be shortened, increasing the refresh frequency.

Alternatively, as shown in FIG. 20, in the retention frame, the pre-stage includes the reset stage and the bias stage in sequence. In the reset stage, the gate of the driving transistor receives a reset signal and a reset is performed. No data writing phase is included between the bias phase and the light emitting phase.

Figure 21:
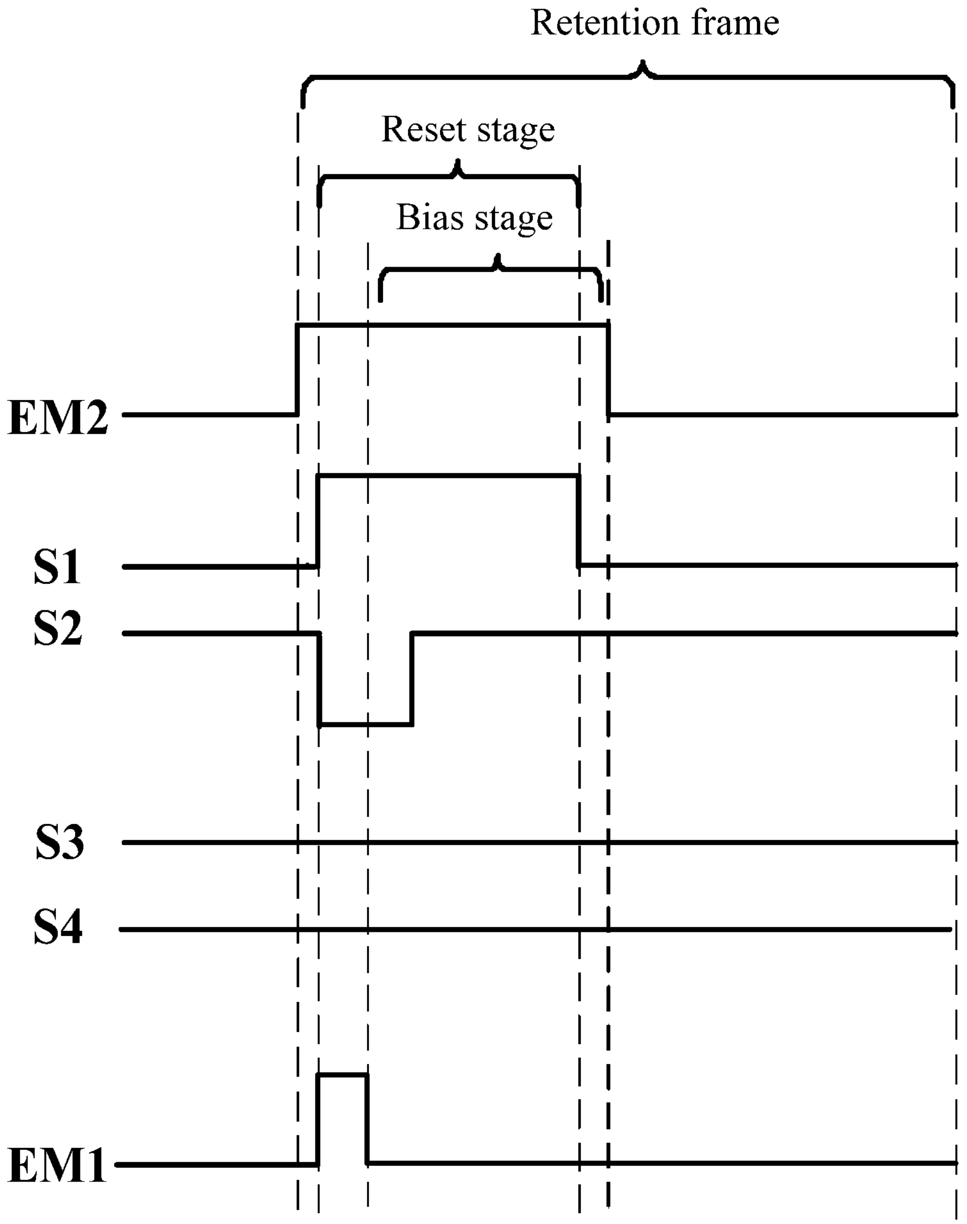
FIG. 21 is a fourteen working timing diagram of a pixel circuit.

FIG. 21 is a fourteen working timing diagram of a pixel circuit. Referring to FIG. 21, alternatively, one data writing cycle of the display panel includes S refreshing frames that include a data write frame and a retention frame, where S>0, and at least one retention frame includes a bias stage. In the at least one retention frame, the pre-stage includes a reset stage and the bias stage. In the reset stage, the gate of the drive transistor receives a reset signal and a reset is performed. The time period of the reset stage at least partially overlaps the time period of the bias stage. In this embodiment, the time period of the reset stage at least partially overlaps the time period of the bias stage in the at least one retention frame so that the duration of the pre-stage of the at least one retention frame can be shortened, thereby shortening the working duration of the at least one retention frame and further increasing the refresh frequency.

It is to be noted that in this embodiment, it is feasible to configure only the pre-stage of the data write frame to include a bias stage and configure the pre-stage of the retention frame not to include a bias stage. If the bias problem can be solved by only the data write frame, the bias stage is not required in the retention frame. Alternatively, it is feasible to configure only the pre-stage of the retention frame to include the bias stage and configure the pre-stage of the data write frame not to include the bias stage. Since the data write frame also undertakes the work of the reset stage and the data writing stage, if the retention frame can fully undertake the work of the bias stage, it is not needed to configure a bias stage in the data write frame, thereby simplifying the timing of the data write frame.

It is to be noted that in the preceding drawings, description is given using an example in which the initialization stage of the light-emitting element at least partially overlaps the reset stage and the bias stage, but this embodiment is not limited to the preceding situation. In some other embodiments, the following schemes are feasible: the initialization stage does not overlap the bias stage; the initialization stage is performed throughout the bias stage; and the initialization stage is still performed when the bias stage ends. A flexible design is allowed according to the specific circuit.

Based on the same concept, an embodiment of the present disclosure further provides a driving method of a display panel. The display panel in this embodiment includes a pixel circuit and a light-emitting element; the pixel circuit includes a light emitting control module, a drive module and a compensation module; the light emitting control module includes a first light emitting control module configured to selectively provide a first power supply signal for the drive module; the drive module is configured to provide a drive current for the light-emitting element and includes a drive transistor; and the compensation module is configured to compensate a threshold voltage of the drive transistor.

Figure 22:
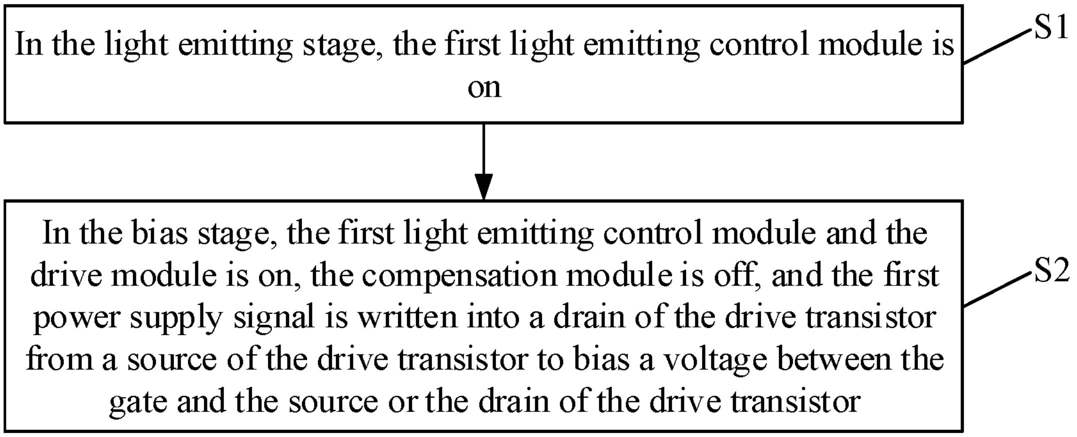
FIG. 22 is a schematic diagram of a driving method for a display panel provided by an embodiment of the present disclosure.

FIG. 22 is a schematic diagram of a driving method for a display panel provided by an embodiment of the present disclosure. Referring to FIG. 22, a driving method of at least one frame of the display panel includes the steps described below.

In S1, in the light emitting stage, the first light emitting control module is turned on, and conduction is enabled between the drive transistor and the light-emitting element.

In S2, in a bias stage, the first light emitting control module and the drive module are turned on, the compensation module is turned off, the drive transistor is disconnected from the light-emitting element, and the first power supply signal is written into a drain of the drive transistor from a source of the drive transistor to adjust a bias state of the drive transistor.

For driving methods of other embodiments, reference can be made to the method used in the driving process of any one of the above-mentioned implementations, and it is to be understood that these driving methods fall within the scope of the driving method in this embodiment.

In the embodiment of the present disclosure, the working process of the pixel circuit includes the bias stage. In the bias stage, the first light emitting control module and the drive module are on, the compensation module is off, and the first power supply signal is written into the drain of the drive transistor though the first light emitting control module and the drive module which are on to adjust a drain potential of the drive transistor so as to improve a potential difference between a gate potential of the drive transistor and the drain potential of the drive transistor. It is known that the pixel circuit includes at least one non-bias stage. When a drive current is generated in the drive transistor, the gate potential of the drive transistor may be higher than the drain potential of the drive transistor, resulting in a shift of the I-V curve of the drive transistor and a threshold voltage drift of the drive transistor. In the bias stage, the gate potential and the drain potential of the drive transistor are adjusted, so that the shift of the I-V curve of the drive transistor in the non-bias stage can be balanced, thereby reducing the threshold voltage drift of the drive transistor and ensuring the display uniformity of the display panel.

Based on the same concept, an embodiment of the present disclosure further provides a display device including the display panel according to any one of the embodiments described above. Alternatively, the display panel is an organic light-emitting display panel or a micro light-emitting diode (LED) display panel.

Figure 23:
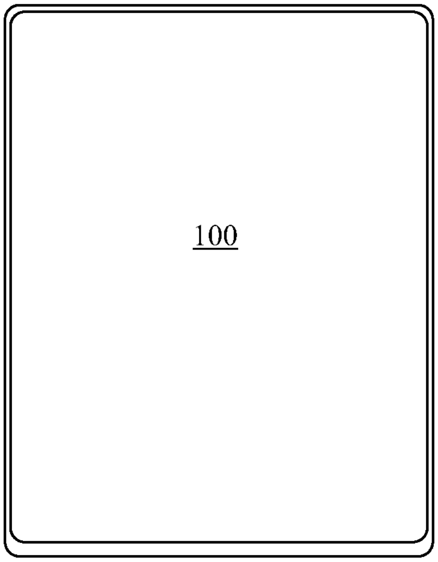
FIG. 23 is a schematic diagram of a display device provided by an embodiment of the present disclosure.

Referring to FIG. 23 which is a schematic diagram of a display device provided by an embodiment of the present disclosure, alternatively, the display device is applied to an electronic device 100 such as a smart phone or a tablet computer. It is understandable that the above-mentioned embodiments merely provide some examples of the structure of the pixel circuit and the driving method of the pixel circuit. The display panel further includes other structures, which will not be repeated here.

It is to be noted that the above are merely the preferred embodiments of the present disclosure and the technical principles used therein. It is to be understood by those skilled in the art that the present disclosure is not limited to the embodiments described herein. Those skilled in the art can make various apparent modifications, adaptations, combinations, and substitutions without departing from the scope of the present disclosure. Therefore, though the present disclosure has been described in detail through the embodiments described above, the present disclosure is not limited to the embodiments described above and may include other equivalent embodiments without departing from the concept of the present disclosure. The scope of the present disclosure is determined by the scope of the appended claims.

What is claimed is:

1. A display panel, comprising:

a pixel circuit and a light-emitting element, wherein the pixel circuit comprises a light emitting control module and a drive module; the drive module comprises a drive transistor; the light emitting control module comprises a first light emitting control module and a second light emitting control module, the first light emitting control module is connected between a first power supply signal terminal and an input terminal of the drive module, and the second light emitting control module is connected between an output terminal of the drive module and the light-emitting element;

wherein a control terminal of the first light emitting control module is connected to a first light emitting control signal line to receive a first light emitting control signal;

wherein a control terminal of the second light emitting control module is connected to a second light emitting control signal line to receive a second light emitting control signal;

wherein a width of the first light emitting control signal line is larger than a width of the second light emitting control signal line; and wherein a working process of the pixel circuit comprises a light emitting stage and a bias stage, wherein in the light emitting stage, the first light emitting control module is on, and the second light emitting control module is on; and in the bias stage, the first light emitting control module is on, and the second light emitting control module is off.

2. The display panel of claim 1, wherein in the light emitting stage, a first power supply signal received by the first light emitting control module is PVDD1; in the bias stage, a first power supply signal received by the first light emitting control module is PVDD2; and PVDD2>PVDD1, or PVDD2<PVDD1.

3. The display panel of claim 1, wherein one data write cycle of the display panel comprises S refreshing frames which comprise a data write frame and a retention frame, wherein S>0;

the pixel circuit further comprises a data write module, an input terminal of the data write module is configured to receive a data signal, and an output terminal of the data write module is connected to an input terminal of the drive module;

the data write frame comprises a data write stage in which the data write module writes a data signal into a gate of the drive transistor; and the retention frame comprises no data write stage.

4. The display panel of claim 3, wherein at least one data write frame and/or at least one retention frame each comprises the bias stage, wherein a duration of the bias stage in the at least one retention frame is longer than a duration of the bias stage in the at least one data write frame.

5. The display panel of claim 3, wherein the display panel comprises at least two data write frames, and bias stages in the at least two data write frames have different durations.

6. The display panel of claim 5, wherein the display panel comprises first data write frames and second data write frames, n second data write frames are comprised between two adjacent ones of the first data write frames, wherein n≥1; and in the first data write frames, the bias stage has a duration of t7, and in the second data write frame, the bias stage has a duration of t8, wherein t7>t8≥0.

7. The display panel of claim 3, wherein the bias stage comprises m bias sub-stages in sequence, wherein m≥1; and in the m bias sub-stages, an interval between two adjacent bias sub-stages is a third interval stage in which the first light emitting control module is off.

8. The display panel of claim 7, wherein the bias stage comprises at least two third interval stages, and the at least two third interval stages have different durations.

9. The display panel of claim 7, wherein at least two of the m bias sub-stages have different durations.

10. The display panel of claim 1, wherein within one frame of the display panel, the working process of the pixel circuit comprises a pre-stage and the light emitting stage, wherein within at least one frame, the pre-stage of the pixel circuit comprises the bias stage.

11. The display panel of claim 10, wherein the pre-stage comprises a reset stage and the bias stage, and in the reset stage, a gate of the drive transistor receives a reset signal and a reset is performed; and/or the pre-stage comprises the bias stage and a data write stage, in the data write stage, a gate of the drive transistor receives a data signal, and the pixel circuit comprises a data write module configured to provide the data signal.

12. The display panel of claim 11, wherein the bias stage has a duration of t1, and the reset stage has a duration of t3, where t1>t3; or the bias stage has a duration of t1, and the data write stage has a duration of t5, wherein t1>t5.

13. The display panel of claim 11, wherein the pre-stage comprises the reset stage and the bias stage, and in the reset stage, the gate of the drive transistor receives the reset signal and the reset is performed; and wherein at an end of the reset stage, the gate of the drive transistor is disconnected from the reset signal, meanwhile, the first light emitting control module is turned on and the pixel circuit enters the bias stage; or between an end of the reset stage and a start of the bias stage, the pre-stage further comprises a first interval stage in which the gate of the drive transistor is disconnected from the reset signal and the first light emitting control module is off.

14. The display panel of claim 13, wherein the bias stage has a duration of t1, the reset stage has a duration of t3 and the first interval stage has a duration of t4, wherein t1>t4, or t3>t4.

15. The display panel of claim 11, wherein the pre-stage comprises the reset stage and the data write stage, and in the data write stage, the gate of the drive transistor receives the data signal, the pixel circuit comprises the data write module configured to provide the data signal; and wherein in the end of the bias stage, the first light emitting control module is turned off, meanwhile, the data write module is turned on, and the pixel circuit enters the data write stage;

or from an end of the bias stage to a start of the data write stage, the pixel circuit comprises a second interval stage in which the first light emitting control module is off and the data write module is off.

16. The display panel of claim 15, wherein the bias stage has a duration of t1, the data write stage has a duration of t5, and the second interval stage has a duration of t6, wherein t1>t6, or t5>t6.

17. The display panel of claim 11, wherein the pre-stage comprises the reset stage and the bias stage, in the reset stage, the gate of the drive transistor receives the reset signal and the reset is performed;

the reset stage comprises a first reset stage and a second reset stage;

in the first reset stage whose time period does not overlap the time period of the bias stage, the gate of the drive transistor receives a first reset signal; and in at least part of the time period of the bias stage, the gate of the drive transistor receives a second reset signal, and the time period of the bias stage at least partially overlaps a time period of the second reset stage, wherein the first reset signal and the second reset signal have a same potential; or the first reset signal and the second reset signal have different potentials.

18. The display panel of claim 17, wherein an absolute value of a potential of the first reset signal is less than an absolute value of a potential of the second reset signal; wherein the drive transistor is a PMOS transistor, and the potential of the second reset signal is lower than the potential of the first reset signal; or the drive transistor is an NMOS transistor, and the potential of the second reset signal is higher than the potential of the first reset signal; or an absolute value of a potential of the first reset signal is great than an absolute value of a potential of the second reset signal; wherein the drive transistor is a PMOS transistor, and the potential of the second reset signal is lower than the potential of the first reset signal; or the drive transistor is an NMOS transistor, and the potential of the second reset signal is higher than the potential of the first reset signal.

19. A display device, comprising a display panel, wherein the display panel comprises:

a pixel circuit and a light-emitting element, wherein the pixel circuit comprises a light emitting control module and a drive module; the drive module comprises a drive transistor; the light emitting control module comprises a first light emitting control module and a second light emitting control module, the first light emitting control module is connected between a first power supply signal terminal and an input terminal of the drive module, and the second light emitting control module is connected between an output terminal of the drive module and the light-emitting element;

wherein a control terminal of the first light emitting control module is connected to a first light emitting control signal line to receive a first light emitting control signal;

wherein a control terminal of the second light emitting control module is connected to a second light emitting control signal line to receive a second light emitting control signal;

wherein a width of the first light emitting control signal line is larger than a width of the second light emitting control signal line; and wherein a working process of the pixel circuit comprises a light emitting stage and a bias stage, wherein in the light emitting stage, the first light emitting control module is on, and the second light emitting control module is on; and in the bias stage, the first light emitting control module is on, and the second light emitting control module is off.

20. The display device of claim 19, wherein in the light emitting stage, a first power supply signal received by the first light emitting control module is PVDD1;

in the bias stage, a first power supply signal received by the first light emitting control module is PVDD2; and PVDD2>PVDD1, or PVDD2<PVDD1.

* * * * *